United States Patent
Fritchman et al.

(10) Patent No.: US 9,021,159 B2
(45) Date of Patent: Apr. 28, 2015

(54) CONNECTOR ADAPTER

(75) Inventors: Daniel J. Fritchman, Sunnyvale, CA (US); Tony Chi Wang Ng, Santa Clara, CA (US); Jeffrey J. Terlizzi, San Francisco, CA (US); Scott Krueger, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 13/607,443

(22) Filed: Sep. 7, 2012

(65) Prior Publication Data

US 2014/0075061 A1   Mar. 13, 2014

(51) Int. Cl.
  G06F 13/12   (2006.01)
  H01R 31/06   (2006.01)
  G06F 1/16    (2006.01)
  G06F 13/38   (2006.01)

(52) U.S. Cl.
  CPC ............ *H01R 31/065* (2013.01); *G06F 1/1632* (2013.01); *G06F 13/387* (2013.01); *G06F 13/385* (2013.01)

(58) Field of Classification Search
  CPC ....................................................... G06F 1/00
  See application file for complete search history.

(56) References Cited

U.S. PATENT DOCUMENTS

| | | | |
|---|---|---|---|
| 5,387,110 A | 2/1995 | Kantner et al. | |
| 6,145,035 A | 11/2000 | Mai et al. | |
| 6,408,351 B1 | 6/2002 | Hamdi et al. | |
| 6,934,561 B2 | 8/2005 | Burrus | |
| 7,005,889 B2 | 2/2006 | Sowden et al. | |
| 7,127,541 B2 | 10/2006 | Govindarajulu et al. | |
| 7,305,254 B2 | 12/2007 | Findikli | |
| 7,305,511 B2 | 12/2007 | Barrett et al. | |
| 7,453,233 B2 | 11/2008 | Fischer et al. | |
| 7,591,657 B2 | 9/2009 | Teicher | |
| 7,762,470 B2 | 7/2010 | Finn et al. | |
| 7,840,729 B2 | 11/2010 | Inoue et al. | |
| 8,041,300 B2 | 10/2011 | Dorogusker et al. | |
| 8,126,734 B2 | 2/2012 | Dicks et al. | |

(Continued)

FOREIGN PATENT DOCUMENTS

| JP | 02-078171 A | 3/1990 |
|---|---|---|
| JP | 2006164706 A | 6/2006 |

(Continued)

OTHER PUBLICATIONS

Non-Final Office Action for U.S. Appl. No. 13/731,634, mailed Jun. 17, 2013, 10 pages.

(Continued)

*Primary Examiner* — Henry Tsai
*Assistant Examiner* — Juanito Borromeo
(74) *Attorney, Agent, or Firm* — Kilpatrick Townsend & Stockton LLP

(57) ABSTRACT

An adapter for providing connectivity between a host connector of a host device and an accessory connector of an accessory that is incompatible with the host connector is described. The adapter can include a host interface connector that is compatible with the host connector, and an accessory interface connector that is compatible with the accessory connector of the accessory. The adapter may further include an identification module that can provide adapter identification information to a host device connected to the host interface connector, and may also include an authentication module that can authenticate an accessory connected to the accessory interface connector.

23 Claims, 10 Drawing Sheets

(56) References Cited

U.S. PATENT DOCUMENTS

| | | | |
|---|---|---|---|
| 8,161,567 B2 | 4/2012 | Rubinstein et al. | |
| 8,208,853 B2 | 6/2012 | Lydon et al. | |
| 8,238,811 B2 | 8/2012 | Lydon | |
| 8,275,924 B2 | 9/2012 | Krueger et al. | |
| 8,280,465 B2 | 10/2012 | Dorogusker et al. | |
| 8,296,587 B2 | 10/2012 | Paniagua et al. | |
| 8,369,785 B2 | 2/2013 | Dorogusker et al. | |
| 8,478,913 B2 | 7/2013 | Terlizzi et al. | |
| 8,515,580 B2 | 8/2013 | Taylor et al. | |
| 8,688,876 B1 | 4/2014 | Fritchman et al. | |
| 8,762,605 B2 | 6/2014 | Terlizzi et al. | |
| 8,886,849 B2 | 11/2014 | Golembeski et al. | |
| 2004/0103223 A1 | 5/2004 | Gabehart et al. | |
| 2006/0056401 A1 | 3/2006 | Bohm et al. | |
| 2006/0156415 A1 | 7/2006 | Rubinstein et al. | |
| 2007/0214305 A1 | 9/2007 | Levy | |
| 2008/0140872 A1 | 6/2008 | Wright | |
| 2008/0150480 A1 | 6/2008 | Navid | |
| 2008/0319732 A1 | 12/2008 | Farnsworth | |
| 2009/0063744 A1 | 3/2009 | Krueger et al. | |
| 2009/0179768 A1 | 7/2009 | Sander et al. | |
| 2009/0254746 A1 | 10/2009 | Aihara et al. | |
| 2010/0064065 A1 | 3/2010 | Depta et al. | |
| 2010/0075604 A1 | 3/2010 | Lydon et al. | |
| 2010/0077121 A1 | 3/2010 | Lai et al. | |
| 2010/0080563 A1 | 4/2010 | DiFonzo et al. | |
| 2010/0180063 A1 | 7/2010 | Ananny et al. | |
| 2010/0198286 A1 | 8/2010 | Neumiller et al. | |
| 2011/0055407 A1 | 3/2011 | Lydon et al. | |
| 2011/0061113 A1 | 3/2011 | Rubinstein et al. | |
| 2011/0078354 A1 | 3/2011 | Krueger et al. | |
| 2011/0167176 A1 | 7/2011 | Yew et al. | |
| 2011/0276734 A1 | 11/2011 | Helfrich | |
| 2012/0005395 A1 | 1/2012 | Lydon et al. | |
| 2012/0096207 A1 | 4/2012 | Chen | |
| 2012/0131230 A1* | 5/2012 | Ady et al. | 710/8 |
| 2012/0252261 A1* | 10/2012 | Wu | 439/501 |
| 2013/0080662 A1 | 3/2013 | Bourque | |
| 2013/0138861 A1 | 5/2013 | Terlizzi et al. | |
| 2013/0238823 A1 | 9/2013 | Terlizzi et al. | |
| 2013/0304942 A1 | 11/2013 | Golembeski et al. | |
| 2014/0073188 A1 | 3/2014 | Fritchman et al. | |
| 2014/0075210 A1 | 3/2014 | Rich et al. | |

FOREIGN PATENT DOCUMENTS

| | | |
|---|---|---|
| JP | 2008225939 A | 9/2008 |
| WO | 02/08872 A1 | 1/2002 |
| WO | 2009/032797 A2 | 3/2009 |
| WO | 2009/069969 A1 | 6/2009 |
| WO | 2010/027694 A1 | 3/2010 |
| WO | 2011/150403 A1 | 12/2011 |
| WO | WO 2012/112147 A1 | 8/2012 |

OTHER PUBLICATIONS

International Search Report and Written Opinion for PCT Application No. PCT/US2013/035005, mailed Jul. 29, 2013, 8 pages.
Notice of Allowance for U.S. Appl. No. 13/680,000, mailed Apr. 26, 2013, 31 pages.
"Reversible USB connector fits into ports either ways", Free Press Release, Jun. 25, 2010, 1 page.
"USB-Peripheral to Ethernet Adapter: User Guide" Mobility Electronics, 2005, 16 pages.
Notice of Allowance for U.S. Appl. No. 13/731,634, mailed Nov. 18, 2013, 9 pages.
USB Implementers Forum: "Universal Serial Bus Specification Revision 2.0—Chapters 1-5 and 9", Internet Citation, Apr. 27, 2000, XP002412161, Retrieved from the Internet: URL:http://www.usb.org.developers/docs/usb_20_05122006.zip, retrieved on Dec. 19, 2006, 147 pages.

* cited by examiner

| PIN | Signal Name | I/O | Function |
|---|---|---|---|
| 1 | DGND | GND | Digital Ground |
| 2 | DGND | GND | Digital Ground |
| 3 | TPA+ | I/O | FireWire signal |
| 4 | USB D+ | I/O | USB signal |
| 5 | TPA- | I/O | FireWire signal |
| 6 | USB D- | I/O | USB signal |
| 7 | TPB+ | I/O | FireWire signal |
| 8 | USB PWR | I | USB power in; used to detect USB hub |
| 9 | TPB- | I/O | FireWire signal |
| 10 | Accessory Identify | I | Connection for accessory identification resistor |
| 11 | F/W PWR+ | I | Firewire and charger input power (8V to 15V dc) |
| 12 | F/W PWR+ | I | Firewire and charger input power (8V to 15V dc) |
| 13 | Accessory Pwr | O | Nominal 3.3V output; current limited to 100 mA |
| 14 | Reserved | | |
| 15 | DGND | GND | Digital Ground |
| 16 | DGND | GND | Digital Ground |
| 17 | Reserved | | |
| 18 | RX | I | Serial protocol input to media player |
| 19 | TX | O | Serial protocol output from media player |
| 20 | Accessory Detect | I | Connection for accessory identification resistor |
| 21 | S Video Y | O | Luminance component for S-video |
| 22 | S Video C | O | Chrominance component for S-video |
| 23 | Composite Video | O | Composite video signal |
| 24 | Remote sense | I | Detect remote |
| 25 | LINE-IN L | I | Line level input for left audio channel |
| 26 | LINE-IN R | I | Line level input for right audio channel |
| 27 | LINE-OUT L | O | Line level output to left audio channel |
| 28 | LINE-OUT R | O | Line level output to right audio channel |
| 29 | Audio Return | --- | Signal, not to be grounded in accessory |
| 30 | DGND | GND | Digital ground |

*Fig. 7*

CONNECTOR ADAPTER

BACKGROUND

Portable electronic devices, such as portable media players, portable computing devices, and portable communication devices, have become ubiquitous in today's society. As they have proliferated, so have the number and types of hardware accessories that are designed to interact with these portable electronic devices. These accessories range in complexity, including, for example, simple speaker systems and complex automotive entertainment systems.

An accessory may communicate with a portable electronic device using a connector system. This connector system may include a plug connector that is associated with the accessory and a receptacle connector that is associated with the portable electronic device. A user may connect the plug connector of the accessory to the receptacle connector of the portable electronic device thereby forming physical and electrical connections between the contacts of each of the connectors. The host device and the accessory may then exchange data and/or send/receive power using the connectors.

Users may have multiple different portable electronic devices. For various reasons, these portable electronic devices may have different sized connectors. For example, the portable electronic devices may be made by different manufacturers. The portable electronic devices may also be made by the same manufacturer, but a newer model of the portable electronic device may have a more advanced, smaller sized connector receptacle than an older model manufactured by the same company.

For these and other reasons, a user may encounter a situation where the user has a portable electronic device that has a connector that is incompatible with the connectors of certain accessories designed to operate with the a different portable electronic device.

SUMMARY

Embodiments of the present invention provide circuits, methods, and apparatuses that provide compatibility between portable electronic devices and accessories that may have a connector which is incompatible with the portable electronic devices. For convenience, portable electronic devices such as portable media players, portable computing devices, and portable communication devices or other electronic devices that can be used with accessories are referred to as a "host device" herein. An exemplary embodiment of the present invention provides an adapter that includes an accessory interface connector that can mate with an accessory connector of an accessory and a host interface connector that can mate with a host connector of a host device. The adapter may also include conversion circuitry to convert data received from the host device (referred to herein as "host data") into a format recognizable/usable by the accessory. The conversion circuitry may also convert data received from the accessory (referred to herein as "accessory data") into a format recognizable/usable by the host device. The adapter may also include authentication circuitry that can be used to authenticate the adapter to a host device.

The accessory connector of an accessory may be incompatible with a host connector of a host device in at least two ways. First, this incompatibility may be physical; i.e. the accessory connector of the accessory may have a different shape/size/structure than the host connector of the host device. In this instance, it may not be possible to physically mate the two connectors due to the difference in their shape, size, structure, or a combination of these attributes. For example, the number of contacts or pins of the accessory connector may be different than the number of contacts or pins of the host connector. Second, this incompatibility may be electrical; signals received or provided at the accessory connector of the accessory may be electrically incompatible with signals received or provided at the host connector of the host device. In some instances the incompatibility may be both physical and electrical.

Where the incompatibility is physical, an embodiment of the present invention provides an adapter having: (a) an accessory interface connector that is physically compatible with the accessory connector of an accessory; and (b) a host interface connector that is physically compatible with the host connector of a host device. One or more electrical connections may be made between the accessory interface contacts or pins of the accessory interface connector and the host interface contacts or pins of the host interface connector on the adapter. Where the incompatibility is electrical, an embodiment of the present invention provides one or more conversion circuits disposed in the adapter between the accessory interface contacts or pins of the accessory interface connector and the host interface contacts or pins of the host interface connector on the adapter. The conversion circuits can convert one form of data into another to make the data compatible with the host device and/or the accessory based on the application. Where the incompatibility is both physical and electrical, both these techniques may be employed by embodiments of the present invention.

A host device may include authentication circuitry that communicates with authentication circuitry in an accessory during a mating event to authenticate the accessory. If the authentication process is successful, the host device and accessory can exchange data and the accessory can be used with the particular host device. If the authentication fails, however, the host device may disable communication with the accessory. Some embodiments of an adapter according to the present invention include circuitry that performs two levels of authentication. In a first level, the adapter authenticates itself to the host device using a host authentication protocol that the host device uses to authenticate accessories designed to operate with it. If this authentication process is successfully completed and the adapter is permitted to communicate with the host device, a second level of authentication can then occur where the adapter authenticates the accessory connected to the adapter according to an accessory authentication protocol that the accessory would normally employ when connecting to a host device that the accessory was designed to operate with. Alternatively, the adapter may receive accessory identification information from the accessory, and send the accessory identification information to the host device to allow the host device to authenticate the accessory.

In one embodiment, the circuitry within the adapter can also set selected contacts of its accessory interface connector to an open or disconnected state and then connect the open contacts to appropriate circuitry after the first level of authentication is completed. Such an embodiment prevents an accessory connected to the accessory interface connector from recognizing that it is connected to the adapter and potentially to the host device until after the first level of authentication is completed. For instance, if the accessory is not electrically isolated prior to authentication of the adapter, the accessory may immediately send power to the host device via the adapter. If the adapter is not an authorized device, which can mean that the adapter lacks the proper power protection or conversion circuitry to operate with the host device, excessive voltage or current provided from the accessory through the unauthorized adapter may cause damage to the host device. Thus, keeping the accessory electrically isolated in this manner may help prevent potential damage to the host device and/or the accessory caused by electrical incompatibility.

One particular embodiment of the invention pertains to an adapter that includes an accessory interface connector that includes a receptacle connector having up to 30 pins/contact and generally compatible with products manufactured by Apple Inc., such as the iPod®, iPad® or iPhone® family of devices. In one particular embodiment, the host interface connector of an adapter may have between 4 and 16 contacts, which may include a first pair of data contacts designated for the transmission of data using a communication protocol, such as Universal Serial Bus (USB) communication protocol, and a second pair of data contacts designated for the transmission of data using either a proprietary communication protocol or a Universal Asynchronous Receiver/Transmitter (UART) protocol. Conversion circuitry within the adapter converts signals and voltages received from an accessory connected to the accessory interface connector into signals and voltages that can be transmitted over the host interface connector and processed by a host device. The conversion circuitry may also convert signals and voltages sent to the adapter by the host device to signals and voltages that can be transmitted to and processed by the accessory.

In one particular embodiment, the adapter includes conversion circuitry to convert host data received over the data contacts of the host interface to accessory data, which is then transmitted to the accessory over the accessory interface connector. The host data may be received using a custom communication protocol that packs both media data (e.g., audio, image, and/or video data) and communication data (e.g., bulk transfer data, commands, control information, and/or data other than media data) together in a single custom data stream. The conversion circuitry extracts the media data from the custom data stream and sends it to a digital-to-analog converter to be converted to analog media data (e.g., audio line-out signals, composite video signal, and/or S-video signals, etc.) that is outputted to the accessory via contacts of the accessory interface connector. The conversion circuitry can also extract the communication data and transmit it over a communication channel (e.g., UART or USB signal channel) of the accessory interface connector.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

BRIEF DESCRIPTION OF THE DRAWINGS

FIG. 7 illustrates an exemplary pin-out of an accessory interface connector of an adapter according to an embodiment of the present invention.

DETAILED DESCRIPTION

An accessory may have an accessory connector (e.g., a plug connector or a receptacle connector) that is used to connect to a host connector (e.g., a receptacle connector or a plug connector) of a host device. For ease of understanding, the follow description may refer to an accessory as having a plug connector that can be used to connect to a receptacle connector of a host device. However, it should be understood that an accessory may have a receptacle connector that can be used to connect to a plug connector of a host device. Furthermore, both the host device and the accessory may have plug connectors, and the host device and the accessory may be connected via an adapter that has two receptacle connectors, or both the host device and the accessory may have receptacle connectors, and the host device and the accessory may be connected via an adapter that has two plug connectors.

Figure 1:
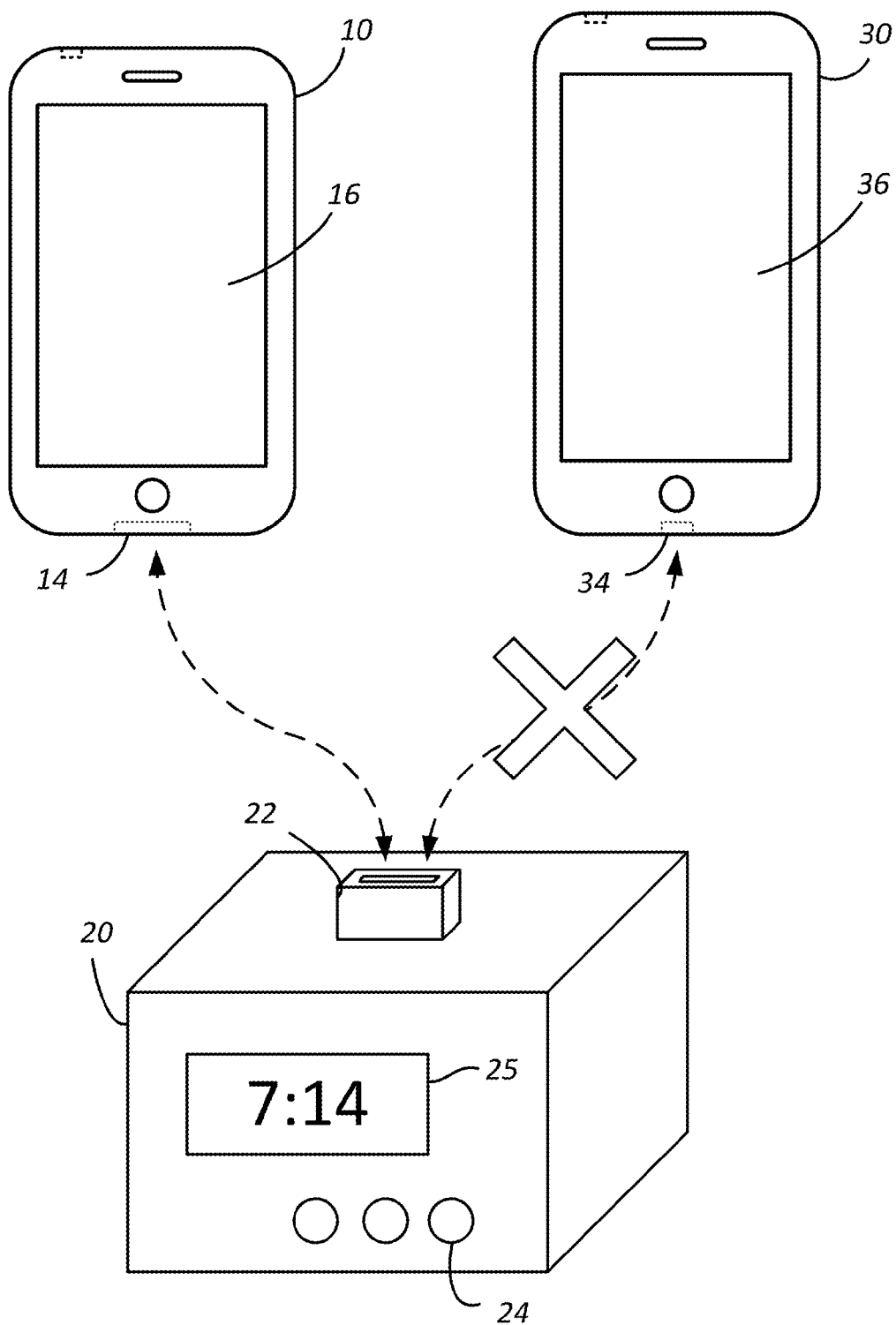
FIG. 1 illustrates an electronic system.

FIG. 1 illustrates an electronic system that can be improved by the incorporation of an embodiment of the present invention. Shown in FIG. 1 is a hardware accessory 20 that a user may want to connect to two different host devices 10 and 30, e.g., in order to extend the functionality of each of host devices 10 and 30. In this example, host device 10 includes a host receptacle connector 14 and a touchscreen 16. Host device 10 may be an iPod®, iPhone®, or similar device designed and manufactured by Apple Inc. of Cupertino, Calif., but it is to be understood that the present invention is not limited to any particular type of portable electronic device.

As shown in FIG. 1, accessory 20 is a clock radio. In other embodiments, the accessory may be an automotive radio, transmitter, cable, audio/video receiver, speaker, docking station, charging source, storage device, or other types of accessory device. Accessory 20 includes control buttons 24, such as volume, tuning, audio source, etc., for controlling the clock radio and a display 25 that can display the time and other information. Accessory 20 also includes an accessory plug connector 22 that includes a plurality of contacts (not shown) that carry electrical signals for one or more of data, audio, video, control functions and power. In one embodiment, accessory plug connector 22 includes between 4 and 30 contacts but the present invention is not limited to any particular number of contacts or contact configuration.

Host receptacle connector 14 includes a cavity in which a plurality of pins or contacts (not shown) are positioned. Accessory plug connector 22 and host receptacle connector 14 are designed to mate with each other to physically and electrically couple the contacts of host receptacle connector 14 with the contacts of accessory plug connector 22 so that signals can be transmitted between the contacts. Thus, accessory plug connector 22 and host receptacle connector 14 can be said to be "compatible" with each other. When host receptacle connector 14 and accessory plug connector 22 are mated, host device 10 can exchange information with accessory 20, e.g., to enable the accessory to play media that is stored on host device 10.

Various host devices and other electronic devices may include host connectors that have a different shape, size or pin configuration than host receptacle connector 14 in which case these other host connectors may not be compatible with or may be "incompatible" with accessory plug connector 22. An accessory connector of an accessory may not be compatible with a host connector of a host device because the accessory connector is designed to mate with products made by one manufacturer, while the host device is made by a different manufacturer. Also, a host device manufacturer may change the design of the host connector for some products, such as newer generation products. For example, a smaller host connector may be incorporated into newer generation products to enable the design of smaller host devices. Also, a host connector with a different pin-out may support new data communication protocols that could not be supported by an older legacy host connector.

There are at least two types of incompatibility that may arise between an accessory connector of an accessory and a host connector of a host device, as described above. First, the accessory connector may be physically incompatible with the host connector, that is, they may have incompatible sizes and literally cannot be connected together in a mechanical sense. FIG. 1 illustrates an example of connectors that are at least physically incompatible with each other. Specifically, host device 30 shown in FIG. 1 includes a host receptacle connector 34 that is considerably smaller than host receptacle connector 14 of host device 10. Accessory plug connector 22 is too large to mate with host receptacle connector 34, and thus accessory plug connector 22 and host receptacle connector 34 are "incompatible" connectors that cannot be mated with each other.

As a second example of incompatibility amongst connectors, an accessory connector of an accessory may not be compatible with a host connector of a host device because one or more signals or power provided on one or more contacts on either the accessory connector or host connector may be electrically incompatible with the corresponding contact on the other connector. This incompatibility may occur at one or more levels of signaling. For example, at a physical layer, the signals may be incompatible due to signal voltages, currents, frequencies, terminations, and/or other physical parameters being different. At a transport level, the signals may be incompatible due to different communication protocols being used. For example, the packet structure, which defines how commands and data are formatted, and multi-packet logic levels, which define sequences of commands, employed by signals carried on contacts of the host connector may be different than the signals carried on the corresponding contacts of the accessory connector.

Figure 2:
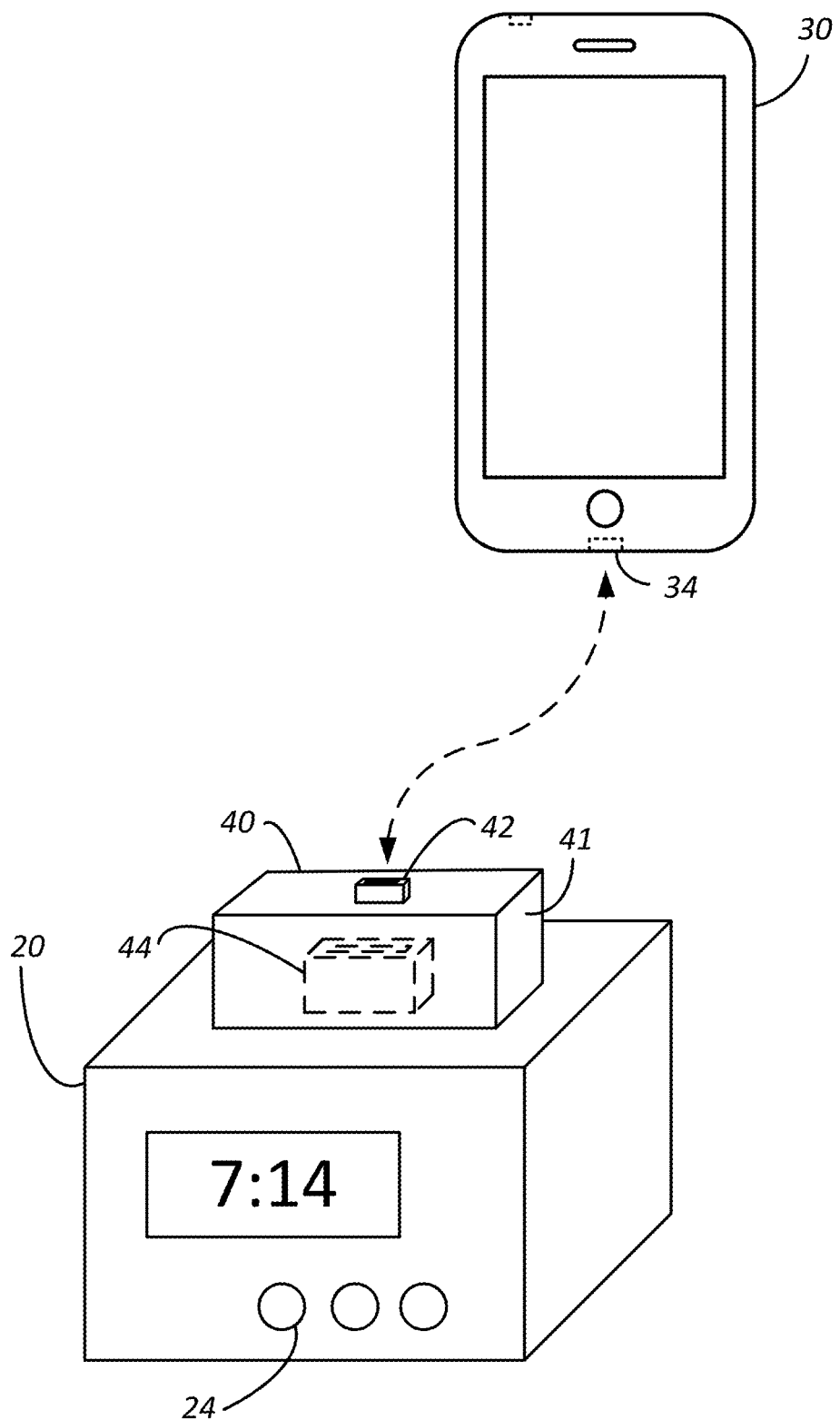
FIG. 2 illustrates an electronic system that includes an adapter according to an embodiment of the present invention.

Embodiments of the present invention provide adapters that allow communication between a host device and an accessory, where a host connector of the host device and an accessory connector of an accessory are incompatible in one or both of these ways. FIG. 2 illustrates an electronic system in which an adapter 40 according to an exemplary embodiment of the present invention is used. Adapter 40 can be connected between the otherwise incompatible accessory connector 22 of accessory 20 and host connector 34 of host device 30 to allow accessory 20 and host device 30 to communicate with each other. Adapter 40 may have a housing 41 that includes an accessory interface connector 44, which can be a receptacle connector, and a host interface connector 42, which can be a plug connector. In other embodiments, adapter 40 can be in a form of a cable with accessory interface connector 44 on one end of the cable, and host interface connector 42 on the other end of the cable. Accessory interface connector 44 is configured to mate with and is thus compatible with accessory plug connector 22 on accessory 20. Host interface connector 42 is configured to mate with and is thus compatible with host receptacle connector 34 on host device 30. Adapter 40 also includes conversion circuitry (not shown in FIG. 2) that converts signals and power received over accessory interface connector 44 from accessory 20 into signals and voltages that can be transmitted over host interface connector 42 for processing by host device 30. The conversion circuitry also converts signals and voltages sent to adapter 40 by host device 30 via host interface connector 42 to signals and voltages that can be transmitted over accessory interface connector 44 for processing by accessory 20.

Figure 3:
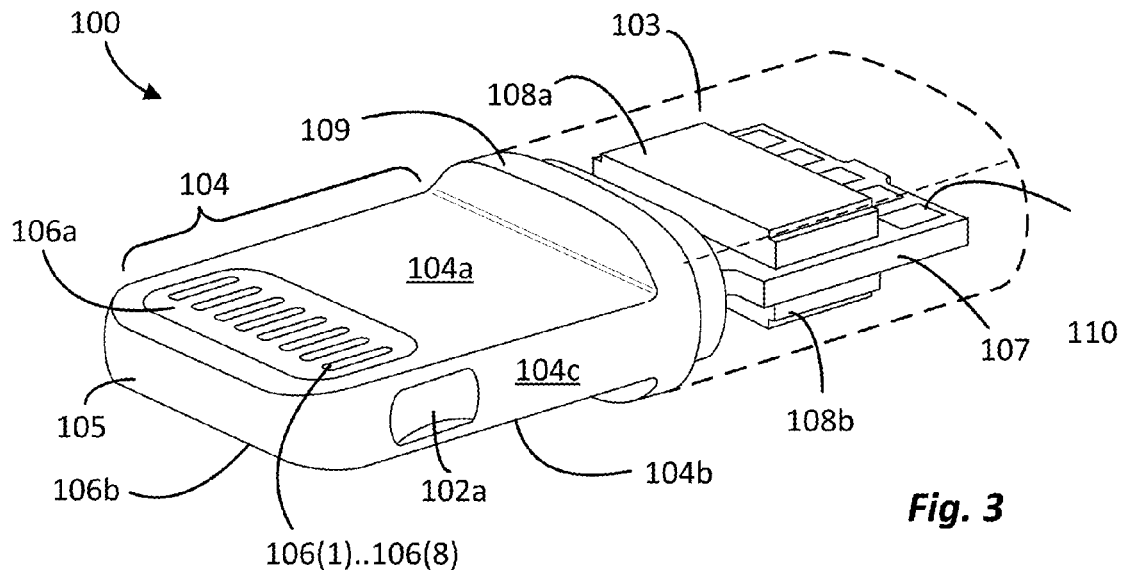
FIG. 3 illustrates a host interface connector of an adapter according to an embodiment of the present invention.

In one particular embodiment, host interface connector 42 can include between 4 and 16 contacts arranged on either side of a printed circuit board as described below. FIG. 3 illustrates a simplified perspective view of such a plug connector 100 that can be used as host interface connector 42. As shown in FIG. 3, plug connector 100 includes a body 103 and a tab portion 104 that extends longitudinally away from body 103 in a direction parallel to the length of the connector. Body 103 can be part of housing 41 of adapter 40, or some other structural component of plug connector 100 that enables plug connector 100 to be attached to housing 41. In some embodiments, adapter 40 may a cable, and body 103 can be part of a cable assembly to provide more flexibility for plug connector 100 to be mated with a host device.

Tab portion 104 is sized to be inserted into a corresponding host receptacle connector, such as host receptacle connector 34 of host device 30 shown in FIG. 2, during a mating event. Tab portion 104 includes a first contact region 106a formed on a first major surface 104a and a second contact region 106b formed at a second major surface 104b opposite of surface 104a. Surfaces 104a and 104b extend from a distal tip of tab portion 104 to a spine 109. When tab portion 104 is inserted into a corresponding host receptacle connector, spine 109 abuts the housing of the host receptacle connector or the host device. Tab portion 104 also includes first and second opposing side surfaces 104c and 104d that extend between the first and second major surfaces 104a and 104b. In one particular embodiment, tab portion 104 is 6.6 mm wide, 1.5 mm thick and has an insertion depth (the distance from the tip of tab portion 104 to spine 109) of 7.9 mm.

The structure and shape of tab portion 104 is defined by a ground ring 105 that can be made from stainless steel or another hard conductive material. Plug connector 100 includes retention features 102a and 102b formed as curved pockets in the sides of ground ring 105 that can also be used as ground contacts. Body 103 is shown in FIG. 3 in transparent form (via dotted lines) so that certain components inside body 103 are visible. As shown, within body 103 is a printed circuit board (PCB) 107 that extends into ground ring 105 between contact regions 106a and 106b towards the distal tip of plug connector 100. One or more integrated circuits (ICs), such as Application Specific Integrated Circuit (ASIC) chips 108a and 108b, can be coupled to PCB 107 to provide information about adapter 40 and/or to perform specific functions, such as authentication, identification, contact configuration, current or power regulation, and/or signal and/or power conversion.

As an example, in one embodiment, the ID module is part of the authentication circuitry of adapter 40 and is embodied within an IC operatively coupled to one or more contacts of plug connector 100. The ID module can be programmed with identification and configuration information about adapter 40. The identification and/or configuration information can be communicated to a host device after the plug connector is physically mated with a corresponding receptacle connector of the host device. As another example, an encryption module programmed to perform an authentication routine, for example a public key encryption routine, in conjunction with circuitry on the host device, can be embodied within an IC operatively coupled to plug connector 100. The ID module and/or encryption module can be embodied within the same IC or within different ICs. As still another example, in embodiments where adapter 40 enables an accessory to charge the host device connected to host interface connector 42, a current regulator can be embodied within one of IC's 108a or 108b. The current regulator can be operatively coupled to contacts that are able to deliver power to charge a battery of the host device and regulate current delivered over those contacts to ensure a constant current regardless of the input voltage and even when the input voltage varies in a transitory manner.

Bonding pads 110 can also be formed within body 103 near the end of PCB 107. Each bonding pad can be connected to a contact or contact pair within contact regions 106a and 106b. Wires (not shown) can then be soldered to the bonding pads to provide an electrical connection from the contacts to circuitry within adapter 40. In some embodiments, however, bonding pads are not necessary and instead all electrical connections between the contacts and components of plug connector 100 and other circuitry within adapter 40 are made through traces on a PCB that the circuitry is coupled to and/or by interconnects between multiple PCBs within adapter 40.

As shown in FIG. 3, up to eight external contacts 106(1) . . . 106(8) can be spaced apart along a single row in contact region 106a. A similar set of eight contacts (not shown) can be spaced apart along a single row in contact region 106b. The two rows of contacts are directly opposite each other and each contact in contact region 106a is electrically connected to a corresponding contact in contact region 106b on the opposite side of the connector. Contacts 106(1) . . . 106(8) can be used to carry a wide variety of signals including digital signals and analog signals as well as power and ground. When plug connector 100 is properly engaged with a receptacle connector, each of contacts 106(1)-106(8) is in electrical connection with a corresponding contact of the receptacle connector.

Figure 4A:
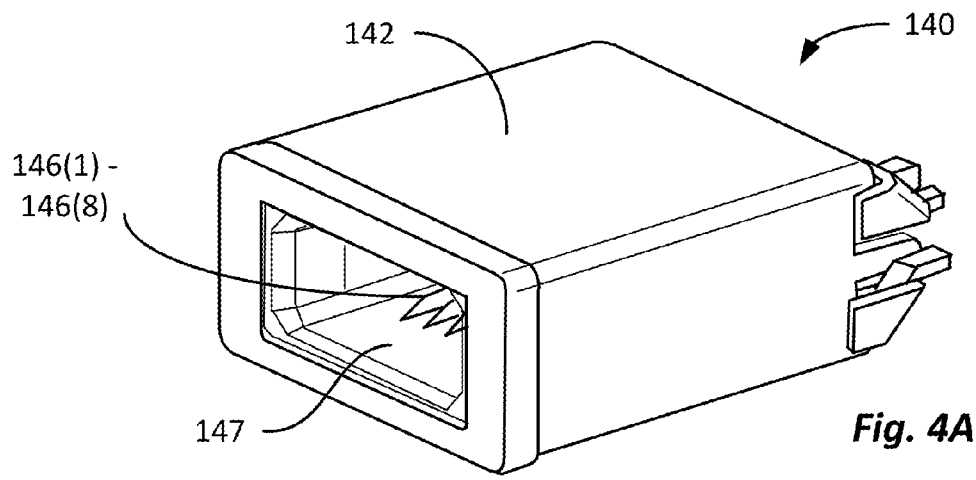
FIG. 4A illustrates a perspective view of a receptacle connector that is compatible with a host interface connector of an adapter according to an embodiment of the present invention.

FIG. 4A illustrates a simplified perspective view of one embodiment of a receptacle connector 140 that plug connector 100 can be coupled with. Receptacle connector 140 includes a housing 142 that defines a cavity 147 and houses up to eight contacts 146(1)-146(8) within cavity 147. Housing 142 can be integrated into a housing of a host device. In operation, a connector plug, such as plug connector 100 can be inserted into cavity 147 to electrically couple the contacts 106(1)-106(8) to respective contacts 146(1)-146(8). Each of the receptacle contacts 146(1)-146(8) electrically connects its respective plug contact to circuitry associated with the electrical device (e.g., a host device) in which receptacle connector 140 is housed. Note that receptacle connector 140 includes contacts on a single side so it can be made thinner. In other embodiments, receptacle connector 140 may have contacts on each side while plug connector 100 may only have contacts on a single side.

Figure 4B:
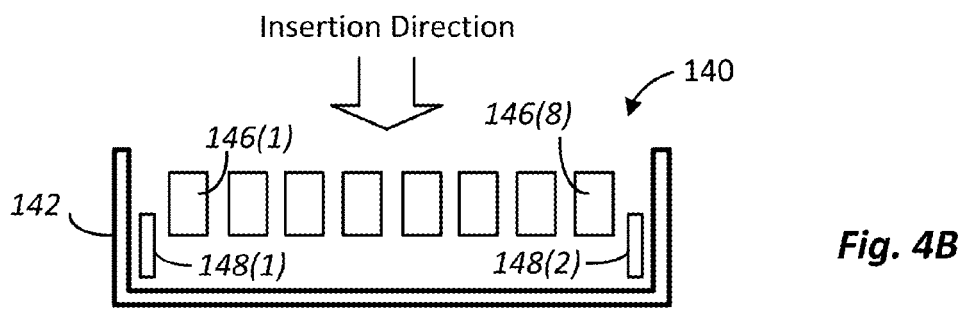
FIG. 4B illustrates a planar cross-section view of a receptacle connector that is compatible with a host interface connector of an adapter according to an embodiment of the present invention.

FIG. 4B illustrates a planar cross-section view of receptacle connector 140. Receptacle connector 140 can, for example, be included in host device 30 as host connector 34. As shown in FIG. 4B, contacts 146(1)-146(8) in receptacle connector 140 are spaced apart in a single row. The contacts are positioned within a cavity 147 that is defined by a housing 142. Receptacle connector 140 also includes side retention mechanisms 146a and 146b (not shown) that engage with retention features 102a and 102b in plug connector 100 to secure plug connector 100 within cavity 147 once the connectors are mated. Receptacle connector 140 also includes two contacts 148(1) and 148(2) that are positioned slightly behind the row of signal contacts and can be used to detect when plug connector 100 is inserted within cavity 147 and detect when plug connector 100 exits cavity 147 when the connectors are disengaged from each other.

When tab portion 104 of plug connector 100 is fully inserted within cavity 147 of receptacle connector 140 during a mating event, each of contacts 106(1) . . . 106(8) from contact region 106a or contacts from 106b are physically and electrically coupled to one of contacts 146(1) . . . 146(8) depending on the insertion orientation of plug connector 100 with respect to receptacle connector 140. Thus, contact 146(1) will be physically connected to either contact 106(1) or 106(8) depending on the insertion orientation; data contacts 146(2) and 146(3) will connect with either data contacts 106(2) and 106(3) or with data contacts 106(7) and 106(6) depending on the insertion orientation, etc.

Figure 5:
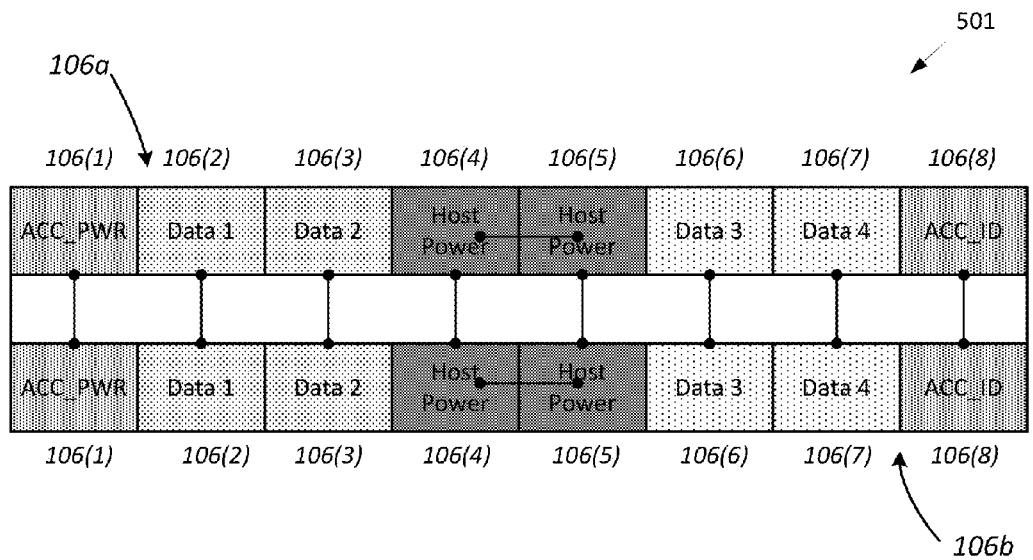
FIG. 5 illustrates an exemplary pin-out of a host interface connector of an adapter according to an embodiment of the present invention.

FIG. 5 illustrates one particular implementation of a pin-out 501 for plug connector 100 according to one embodiment of the invention. On one side of plug connector 100 for contact region 106a, pin-out 501 shown in FIG. 5 includes two host power contacts 106(4) and 106(5) that are electrically coupled together to function as a single contact dedicated to carrying power; an accessory ID contact 106(8); an accessory power contact 106(1); and four data contacts 106(2), 106(3), 106(6) and 106(7). Host power contacts 106(4) and 106(5) can be sized to handle any reasonable power requirement for a host device, and for example, can be designed to carry between 3-20 Volts from an accessory to charge a host device connected to plug connector 100. Host power contacts 106(4) and 106(5) are positioned in the center of contact regions 106a and 106b to improve signal integrity by keeping power as far away as possible from the sides of ground ring 105.

Accessory power contact 106(1) can be used for an accessory power signal that provides power from the host to an accessory. The accessory power signal is typically a lower voltage signal than the power in signal received over host power contacts 106(4) and 106(5), for example, 3.3 volts as compared to 5 volts or higher. The accessory ID contact 106(8) provides a communication channel that enables the host device to authenticate adapter 40 and enables adapter 40 to communicate information to the host device about the adapter's capabilities.

Figure 6:
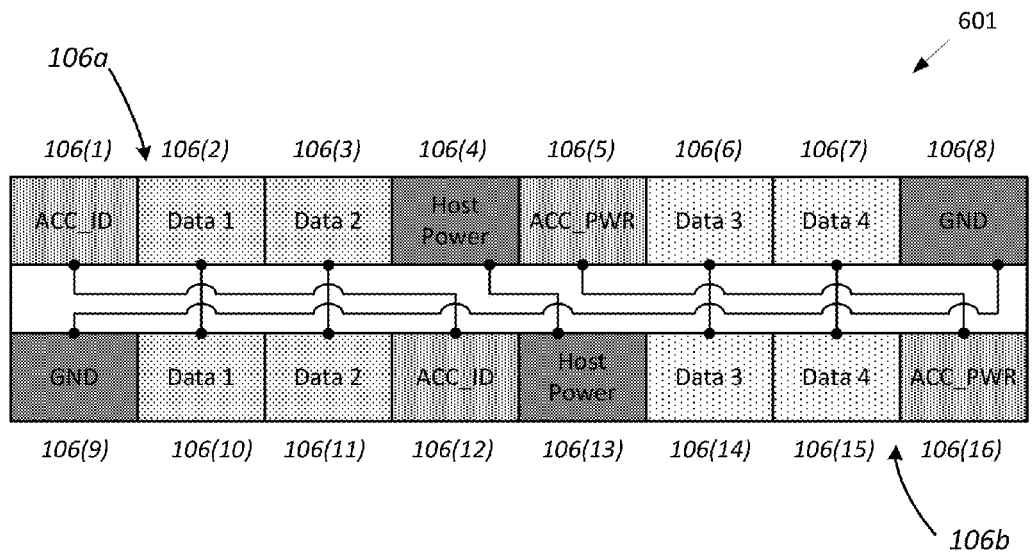
FIG. 6 illustrates an exemplary pin-out of a host interface connector of an adapter according to another embodiment of the present invention.

Data contacts 106(2), 106(3), 106(6) and 106(7) can be used for data communication between the host device and accessory using one or more communication protocols. Data contacts 106(2) and 106(3) are positioned adjacent to and on one side of the host power contacts 106(4) and 106(5), while data contacts 106(6) and 106(7) are positioned adjacent to but on the other side of the host power contacts 106(4) and 106(5). The accessory power contact 106(1) and accessory ID contact 106(8) are positioned at each end of the connector. The data contacts can be high speed data contacts that operate at rate that is two or three orders of magnitude faster than any signals sent over the accessory ID contact 106(8) which causes the accessory ID signal to appear essentially as a DC signal to the high speed data lines. Thus, positioning the data contacts 106(2) and 106(3) between accessory power contact 106(1) and host power contact 106(4), and positioning the data contacts 106(6) and 106(7) between host power contact 106(5) and accessory ID contact 106(8), improve signal integrity by sandwiching the data signals between contacts designated for DC signals or essentially DC signals FIG. 6 illustrates another particular implementation of a pin-out 601 for plug connector 100 according to another embodiment of the invention. Similar to pin-out 501, the plug connector having pin-out 601 is a reversible connector. In other words, based on the orientation in which the plug connector is mated with a corresponding host connector of a host device, either the contacts on the contact region 106a or 106b are in physical and electrical contact with the contacts in the corresponding host connector of the host device. As illustrated in FIG. 6, there are eight contacts arranged within contact region 106a and eight contacts arranged within contact region 106b.

Pin-out 601 shown in FIG. 6 includes two contacts 106(1) and 106(12) that can function as accessory ID contacts to carry the adapter identification signals between adapter 40 and the host device. Contacts 106(1) and 106(12) are electrically connected to each other. The pin-out shown in FIG. 6 can have four pairs of data contacts: (a) 106(2) and 106(3); (b) 106(6) and 106(7); (c) 106(10) and 106 (12); and (d) 106(14) and 106(15). In this particular embodiment, opposing data contacts, e.g., 106(2) and 106(10), are electrically connected to each other. Pin-out 601 further includes host power contacts 106(4) or 106(13) that may be electrically connected to each other. Host power contacts 106(4) or 106(13) carry power to the host device that is mated with plug connector 100. For example, plug connector 100 may be part of a power supply system designed to provide power to the host device. In this instance, either host power contact 106(4) or 106(13) may carry power from the power supply to the host device, e.g., to charge a battery in the host device.

Pin-out 601 of FIG. 6 may further include accessory power contacts 106(5) and 106(16) that may be electrically connected to each other. Accessory power contacts carry power from the host device to a connected accessory. For example, in some instances, an accessory connected to the host device may not be self-powered and may derive its power from the host device. In this instance, the host device can supply power to the accessory over either of the accessory contacts, depending on the orientation of plug connector 100. Pin-out 601 of FIG. 6 may further include two ground contacts 106(8) and 106(9) electrically connected to each other. The ground contacts provide a ground path for plug connector 100.

Referring back to FIG. 2, in one particular embodiment, accessory interface connector 44 is a 30-pin connector compatible with, e.g., iPod® and iPhone® family of devices. FIG. 7 depicts a pin-out 701 for an accessory interface connector, e.g., connector 44 of FIG. 2, according to an embodiment of the present invention.

Figure 8A:
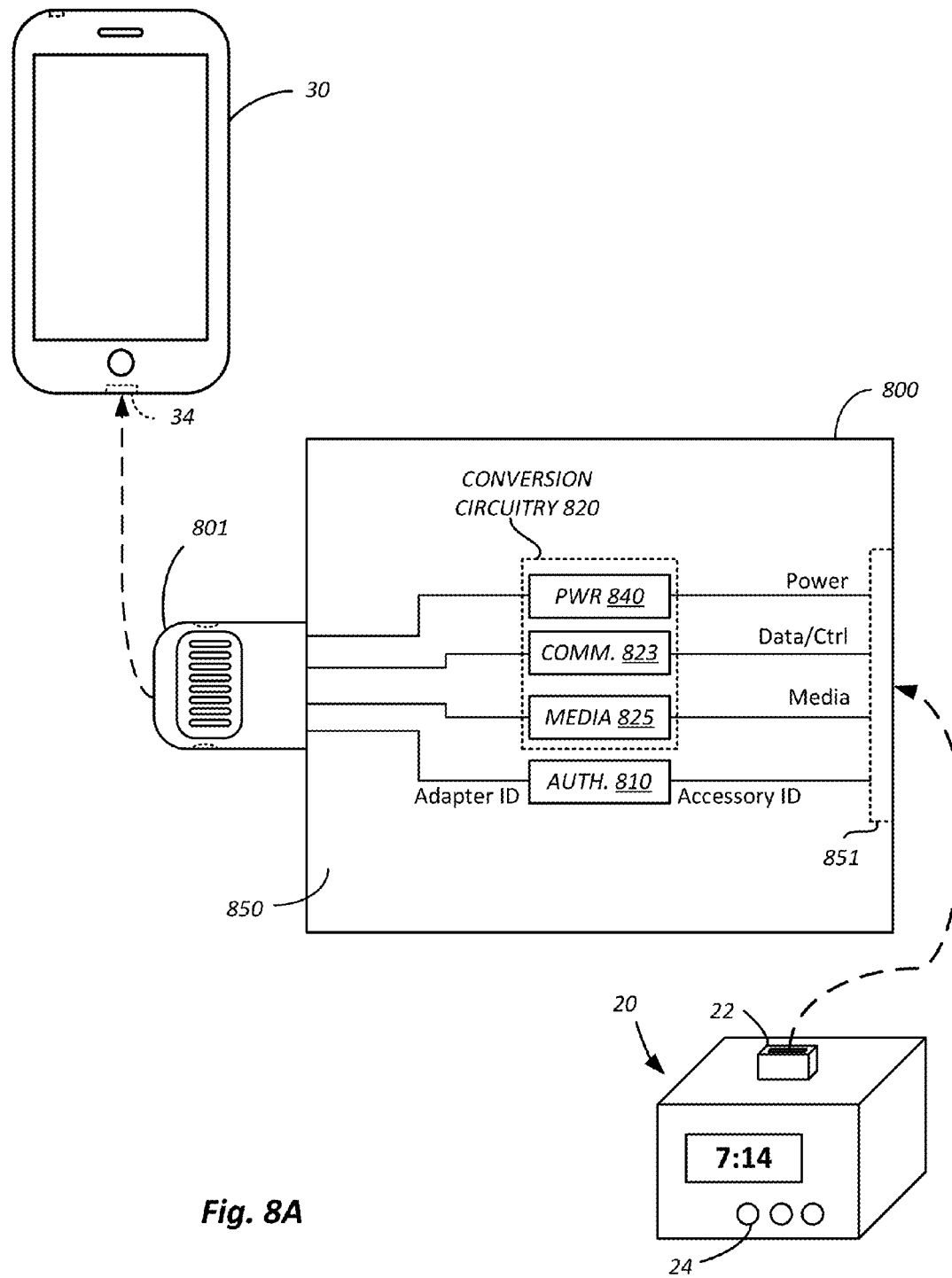
FIG. 8A illustrates a functional block diagram of an adapter according to an embodiment of the present invention.

Reference is now made to FIG. 8A, which illustrates an electronic system according to one embodiment in which an adapter 800 enables an accessory 20 having an accessory connector 22 to communicate with a host device 30 having a host connector 34. It should be noted that to better illustrate the components of adapter 800, the dimensions of adapter 800 shown in FIG. 8A is not drawn to scale with host device 30 and accessory 20. Adapter 800 includes a host interface connector 801 (e.g., plug connector 100 as shown in FIG. 3 having pin-out 501 as shown in FIG. 5 or pin-out 601 as shown in FIG. 6) and an accessory interface connector 851 (e.g., a 30-pin receptacle connector having a pin-out 701 as shown in FIG. 7). Accessory interface connector 851 is compatible with accessory connector 22 of accessory 20, which is shown to be a docking station/clock radio but can be any electronic accessory that includes a connector that can be coupled to adapter 800. Host interface connector 801 is compatible with host connector 34 of host device 30. Accessory connector 22 is physically and electrically incompatible with host connector 34. Adapter 800 can include conversion circuitry 820 and/or authentication circuitry 810 to enable accessory 20 to communicate with host device 30, and vice versa. As shown in FIG. 8A, adapter 800 may include a housing 850 that can incorporate conversion circuitry 820 and authentication circuitry 810 in a single structure.

Conversion circuitry 820 can convert communication signals and power transmitted between accessory 20 and host device 30 into signals and power that each of accessory 20 and host device 30 can process and operate from. In one embodiment, conversion circuitry 820 includes a communication data converter 823, a media data converter 825, and power converter 840. Other embodiments may include a subset of the converters mentioned above or may include additional circuitry than what is illustrated in FIG. 8A. Furthermore, the functionality of each converter or conversion circuitry may be combined, shared, and/or split up into any number of components.

Media data converter 825 can be an audio converter, or video converter, or both, and can include any number of digital-to-analog converters (DACs) and/or analog-to-digital converters (ADCs). Media data converter 825 can be a one-way converter (e.g., only converts video and/or audio data sent from host device 30 to a format that can be received and processed by accessory 20 or only converts video and/or audio data sent from accessory 20 to a format that can be received and processed by host device 30) or a two-way converter (i.e., converts video and/or audio data sent between host device 30 and accessory 20 in both directions). In one particular embodiment, audio/video converter 825 is a one-way converter that converts digital audio data and/or digital video data received from host device 30 via host interface connector 801 into analog audio and/or analog video signals to be transmitted to accessory 20 via accessory interface connector 851. In another embodiment, media data converter 825 only converts audio data, and adapter 800 does not support the conversion of video data between host device 30 and accessory 20. It should be understood that video data can include image data (e.g., still images such as photos, presentations, etc.) as well as motion video data (e.g., movie data, gaming graphics, etc.).

Communication data converter 823 can be a one-way or two-way data converter as well, and can include a controller, bus protocol conversion circuitry, and/or a data multiplexer/de-multiplexer (not shown). In one embodiment, communication data converter 823 is capable of translating data signals transmitted according to one or more communication protocols used by accessory 20 to data signals usable by a communication protocol used by host device 30. In one exemplary embodiment, accessory 20 may use a UART communication protocol and/or a USB communication protocol, and host device 30 may use a proprietary communication protocol. In another embodiment, accessory 20 may use a UART communication protocol, and host device 30 may use a USB communication protocol. Communication data converter 823 can translate data that is in one format into data in a different format that is compatible with an of these communication protocols. Communication data converter 823 may also act as a pass-through entity and merely forward some signals between accessory interface connector 851 and host interface connector 801 without any conversion, e.g., when the signals of the same communication protocol. Communication data converter 823 may also process miscellaneous signals such as accessory detection signals on accessory interface connector 851 to facilitate communication between host device 30 and accessory 20. An accessory detect signal may be an analog signal that indicates to the adapter that the accessory is connected to the adapter and consequently to the host device.

Power converter 840 can convert a DC voltage having a first value and received from accessory 20 on accessory interface connector 851 to a DC voltage having a second value. The converted DC voltage is then provided to host device 30 via host interface connector 801. In some embodiments, power converter 840 can convert a DC voltage received from host device 30 to a different DC voltage for accessory 20. Power converter 840 may also include current regulators to regulate the amount of current sent to accessory 20 and/or host device 30.

In some embodiments, adapter 800 may also include authentication circuitry 810 to perform two levels of authentication. Authentication circuitry 810 may include an identification (ID) module to perform a first level of authentication and an authentication module to perform a second level of authentication. The first level of authentication can include adapter authentication in which adapter 800 authenticates itself to host device 30 by sending adapter identification information to host device 30 via host interface connector 801. In one embodiment, the adapter authentication can be performed by an ID module resident in adapter 800, e.g., ID module 108a of FIG. 3).

In some embodiments, after adapter 800 is authenticated by host device 30 a second level of authentication can occur. The second level of authentication can be an accessory authentication in which an authentication module in adapter 800 authenticates accessory 20 by receiving an accessory identification information from accessory 20 via accessory interface connector 851 according to an authentication protocol that accessory 20 would normally employ when connecting to a host that accessory 20 was designed to operate with. Alternatively, in some embodiments, the authentication module in adapter 800 may not authenticate the accessory directly. Instead, the authentication module may receive accessory identification information from accessory 20 via accessory interface connector 851, and send the accessory identification information to host device 30 via host interface connector 801 to enable the host device to authenticate accessory 20 instead. The authentication module may also translate or convert the accessory identification information into a format that host device 30 can process. For example, the accessory identification information can be a resistance value detected by adapter 800, and the authentication module may translate the resistance value into a data format that can be sent to host device 30. In some embodiments, the accessory authentication can be performed by both adapter 800 and host device 30 may perform accessory authentication. Furthermore, the ID module and the authentication module can be incorporated into one authentication component that can perform both the adapter and accessory authentications.

Figure 8B:
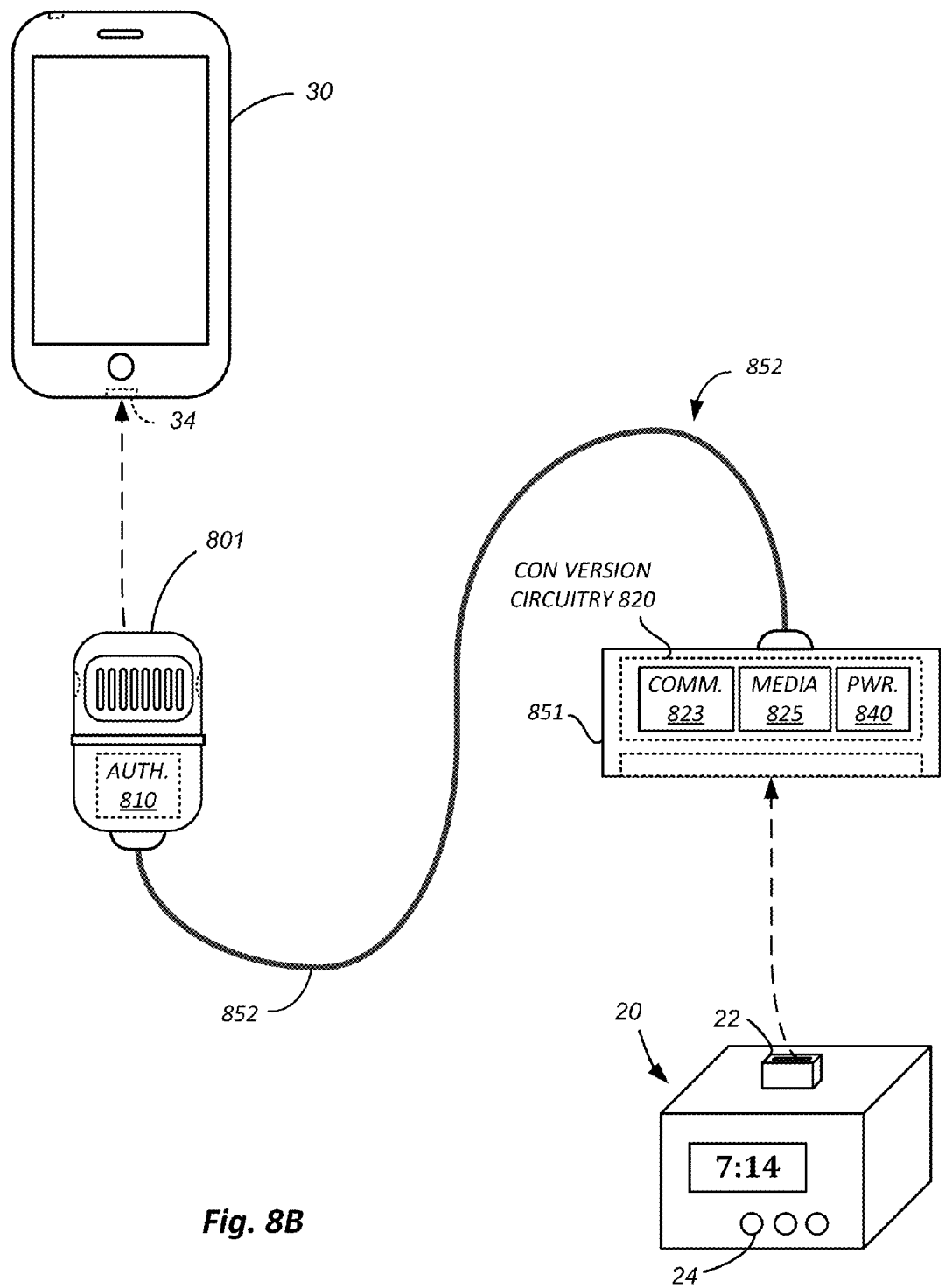
FIG. 8B illustrates a functional block diagram of an adapter according to another embodiment of the present invention.

FIG. 8B illustrates an electronic system according to another embodiment in which an adapter 850 enables an accessory 20 having an accessory connector 22 to communicate with a host device 30 having a host connector 34. It should be noted that to better illustrate the components of adapter 850, the dimensions of adapter 850 shown in FIG. 8B is not drawn to scale with host device 30 and accessory 20. The exemplary embodiment of adapter 850 shown in FIG. 8B includes components that are similar to the components of adapter 800 described above with reference to FIG. 8A, and hence a detailed description of the functionalities of the similar components will not be repeated here.

As shown in FIG. 8B, according to this exemplary embodiment, instead of having a housing that can incorporates both conversion circuitry 820 and authentication circuitry 810 in a single structure, the conversion circuitry 820 can be integrated into accessory interface connector 851, and authentication circuitry 810 can be integrated into host interface connector 801. A cable 852 can be used to coupled signals of host interface connector 801 with signals of accessory interface connector 851. In other embodiments, authentication circuitry 810, and communication data converter 823, media data converter 825, and power converter 840 of conversion circuitry 820 can be split up in any number of ways for incorporation into host interface connector 801 and/or accessory interface connector 951. For example, conversion circuitry 820 can be incorporated into host interface connector 801, or only communication data converter 823 of conversion circuitry 820 may be incorporated into host interface connector 801. In some embodiments, conversion circuitry 820 and authentication circuitry 810 can both be incorporated into host interface connector 801, or alternatively be incorporated into accessory interface connector 851.

Figure 9:
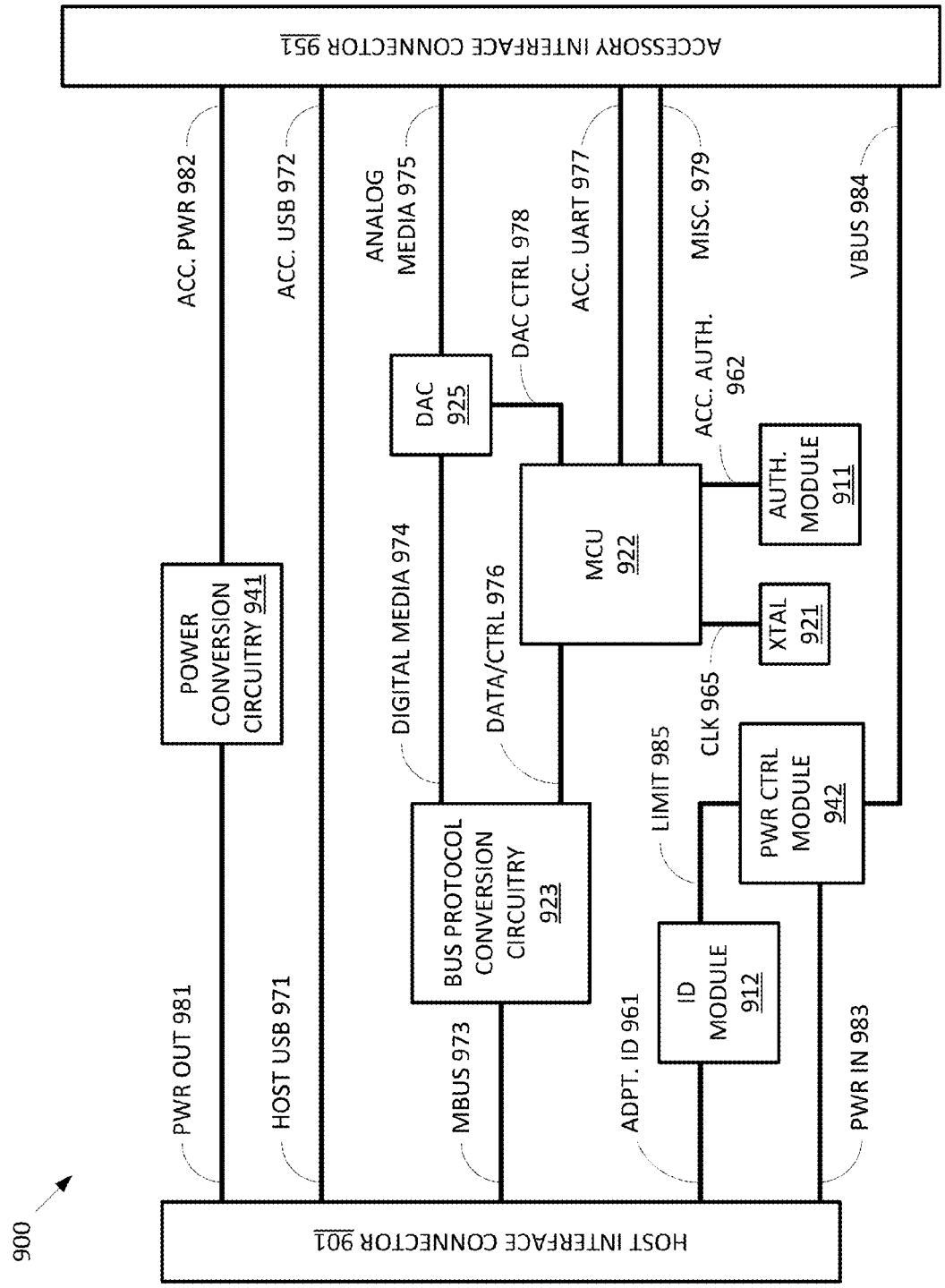
FIG. 9 illustrates a detailed block diagram of an adapter according to an embodiment of the present invention.

FIG. 9 illustrates a detailed block diagram of an adapter 900 according to one exemplary embodiment. Adapter 900 includes a host interface connector 901 and an accessory interface connector 951. Host interface connector 901 is compatible with a host connector of a host device. For example, host interface connector 901 can be implemented as plug connector 100 as shown in FIG. 3 Accessory interface connector 951 is compatible with an accessory connector of an accessory. For example, accessory interface connector 951 can be implemented as the 30-pin connector described above.

In this exemplary embodiment, adapter 900 communicates with a host device via host interface connector 901 using a USB communication protocol over differential host USB signal channel 971 and a proprietary communication protocol over proprietary bus protocol signal channel 973. Host USB signal channel 971 can be coupled to the Data 1 and Data 2 contacts of host interface connector 901, and proprietary bus protocol signal channel 973 can be coupled to Data 3 and Data 4 contacts of host interface connector 901 according to pinouts 501 or 601 as shown in FIGS. 5 and 6, respectively. Alternatively, host USB signal channel 971 can be coupled to the Data 3 and Data 4 contacts of host interface connector 901, and proprietary bus protocol signal channel 973 can be coupled to Data 1 and Data 2 contacts of host interface connector 901.

Host USB signal channel 971 can be used to exchange communication data such as bulk transfer data (e.g., data other than media data for playback), and command and control information which can be used to operate an accessory via the host device, and/or vice versa. The communication data transmitted on host USB signal channel 971 can also include any data that an accessory is designed to exchange with a host device using the USB communication protocol. In some embodiments, host USB signal channel 971 can also be used to exchange audio over USB data and/or video over USB data between a host device and an accessory. In some embodiments, the data over USB channel 971 is transferred between the host device and the accessory without any modification to the data. In other words, channel 971 acts as a "pass-through" for data between the accessory and the host device.

Proprietary bus protocol signal channel 973 can be used to exchange media data such as audio data and/or video data between a host device and an accessory. Proprietary bus protocol signal channel 973 can also be used to exchange communication data such as bulk transfer data, and command and control information which can be used to operate an accessory via the host device, and/or vice versa. Proprietary bus protocol signal channel 973 are capable of carrying both media data and communication data in the same data stream. For example, according to one embodiment, data can be transmitted on the proprietary bus protocol signal channel using a packet structure. The packet structure may include a header or a data type field to indicate whether the particular packet contains media data or communication data. In another embodiment, media data and communication data can be time-multiplexed on the proprietary bus protocol signal channel where certain cycles of the proprietary communication protocol are dedicated for transmission of media data and other cycles of the proprietary communication protocol are dedicated for transmission of communication data.

In the exemplary embodiment shown in FIG. 9, adapter 900 can communicate with an accessory via accessory interface connector 951 using a USB communication protocol over differential accessory USB signal channel 972 and a UART communication protocol over a pair of accessory UART signal channel 977. In some embodiments, accessory USB signal channel 972 can be coupled to pins 4 and 6 (USB D+ and USB D−) of accessory interface connector 951, and the accessory UART signal channel 977 can be coupled to pins 18 and 19 (RX and TX) of accessory interface connector 951 according to pin-out 701 as shown in FIG. 7.

Accessory USB signal channel 972 can be used to exchange communication data such as bulk transfer data, and commands and control information which can be used to operate a host device via the accessory, and/or vice versa. The communication data transmitted over accessory USB signal channel 972 can also include any data that an accessory is designed to exchange with a host device using the USB communication protocol. In some embodiments, accessory USB signal channel 972 can also be used to exchange audio over USB data and/or video over USB data between a host device and an accessory. According to some embodiments and as shown in FIG. 9, accessory USB signal channel 972 can be directly coupled to host USB signal channel 971 without any conversion by adapter 900 such that data transmitted according to USB communication protocol are passed though between a host device and an accessory.

Accessory UART signal channel 977 can also be used to exchange communication data such as bulk transfer data, and commands and control information which can be used to operate a host device via the accessory, and/or vice versa. The communication data transmitted over accessory UART signal channel 977 can also include any data that an accessory is designed to exchange with a host device using the UART communication protocol.

In some embodiments, adapter 900 also provides a set of analog media signals 975 on accessory interface connector 951 for media playback. Analog media signals 975 are used to exchange media data such as audio and/or video data (e.g., image data and/or motion video data) between a host device and an accessory via accessory interface connector 951. In one embodiment, analog media signals 975 may include analog audio line signals that can be coupled to pins 25-28 (LINE-IN L, LINE-IN R, LINE-OUT L, LINE-OUT R) of accessory interface connector 951 according to pin-out 701 as shown in FIG. 7. In some embodiments, adapter 900 may be capable of transmitting audio data from a host device to an accessory over analog media signals 975 for audio playback on an accessory, but cannot transmit audio data from the accessory to the host device. In these embodiments, pins 25-26 (LINE-IN L, LINE-IN R) of accessory interface connector 951 may be unused and can be left unconnected. Analog media signals 975 may also include analog video signals such as S-video and/or composite video signals for video playback on an accessory. In one embodiment, the analog video signals can be coupled to pins 21-23 (S Video Y, S Video C, Composite Video) of accessory interface connector 951 according to pin-out 701 as shown in FIG. 7. In some embodiments, adapter 900 may not be capable of transmitting video data over analog media signals 975, and pins 21-23 (S Video Y, S Video C, Composite Video) of accessory interface connector 951 may be unused and can be left unconnected. In embodiments in which adapter 900 supports only audio or only one-way audio data transmission on analog media signals 975, an accessory may still exchange audio data and/or video data with a host device using accessory USB signal channel 972 by transmitting the audio/video data over USB.

To provide compatibility between host interface signals on host interface connector 901 and accessory interface signals on accessory interface connector 951, adapter 900 includes bus protocol conversion circuitry 923, a controller 922, and a digital-to-analog converter (DAC) 925. Bus protocol conversion circuitry 923 is coupled to proprietary bus protocol signal channel 973 on host interface connector 901. Bus protocol conversion circuitry 923 is also coupled to controller 922 via data and control signals 976 and to DAC 925 via digital media signals 974.

According to various embodiments, bus protocol conversion circuitry 923 can de-multiplex host data transmitted on the proprietary bus protocol signal channel into media data and communication data, and send them to DAC 925 and controller 922, respectively. Bus protocol conversion circuitry 923 is operable to extract or parse out media data from host data transmitted on the proprietary bus protocol signal channel and to send the media data to DAC 925. For example, bus protocol conversion circuitry 923 may monitor the headers of packets sent on proprietary bus protocol signal channel 973 from a host device. For packets that contain media data as indicated by the header information, bus protocol conversion circuitry 923 can translate or convert the media data from the proprietary bus protocol format into another format that is suitable for DAC 925. In one embodiment, bus protocol conversion circuitry 923 translates or converts the media data from the proprietary bus protocol format into an Integrated Interchip Sound (I2S) protocol format that DAC 925 can process, and the converted media data can be sent to DAC 925 via digital media signals 974 according to the I2S protocol. In other embodiments, other protocols that are suitable for transmitting digital media data can be used.

Bus protocol conversion circuitry 923 is also operable to extract or parse out communication data from host data transmitted on the proprietary bus protocol signal channel, and translate or convert the communication data from the proprietary bus protocol format into a communication protocol format suitable for controller 922. For example, the communication data can be translated or converted from the proprietary bus protocol format into a Serial Peripheral Interface (SPI) protocol format or Inter-Integrated Circuit (I2C) protocol format. The converted communication data can be sent to controller 922 via data and control signals 976 according to the particular communication protocol that the communication data is converted into (e.g., according to SPI or I2C protocols).

Bus protocol conversion circuitry 923 can also perform conversion and translation in the other direction, converting media data received from DAC 925 and communication data from controller 922 into a proprietary bus protocol format for transmission on proprietary bus protocol signal channel 973. For example, bus protocol conversion circuitry 923 can translate or convert media data in I2S protocol format received via digital media signals 974 from DAC 925 into the proprietary bus protocol format. Bus protocol conversion circuitry 923 can also translate or convert communication data in SPI protocol format or I2C protocol format received via data and control signals 976 from controller 922 into the proprietary bus protocol format. Bus protocol conversion circuitry 923 can also multiplex and combine the media data from DAC 925 and the communication data from controller 922 into a single data stream for transmission on proprietary bus protocol signal channel 973.

In some embodiments, an accessory may be capable of sending commands and control information over analog audio line signals using ultrasonic tones that are inaudible to humans. For example, an accessory can be a headset with volume and playback controls that can be used to adjust the volume and change the operating mode of a host device. The volume and playback commands can be transmitted to a host device using ultrasonic tones via the same analog audio line signals that are used for transmission of audio data. The ultrasonic tones can be converted by DAC 925 into digital media data (e.g., in I2S protocol format) and transmitted to bus protocol conversion circuitry 923 as media data. In these embodiments, bus protocol conversion circuitry 923 may convert the commands and control information transmitted as ultrasonic tones encoded in digital media data on digital media signals 974 into media data in the proprietary bus protocol format, and send them to a host device as media data on proprietary bus protocol signal channel 973. Alternatively, bus protocol conversion circuitry 923 may convert the commands and control information transmitted as ultrasonic tones into communication data in the proprietary bus protocol format, and send them to a host device as communication data instead of media data on proprietary bus protocol signal channel 973.

Similarly, in some embodiments, a host device may be capable of sending commands and control information to an accessory using ultrasonic tones. The commands and control information can be transmitted from a host device as communication data on proprietary bus protocol signal channel 973. Bus protocol conversion circuitry 923 may extract or parse out these commands and control information from host data received on proprietary bus protocol signal channel 973. Instead of sending the commands and control information as communication data to controller 922, bus protocol conversion circuitry 923 may send the commands and control information as ultrasonic tones encoded in media data over digital media signals 974 to DAC 925. DAC 925 may then send the commands and control information as ultrasonic tones to an accessory via analog media signals 975. Alternatively, a host device may send the commands and control information as media data on proprietary bus protocol signal channel 973. Bus protocol conversion circuitry 923 may treat the commands and control information as if they are media data, and may send the commands and control information as media data to DAC 925 over digital media signals 974.

DAC 925 includes codecs for converting digital media data from a host device into analog media data in a format suitable for use by the accessory. For example, DAC 925 can convert digital audio data received on digital media signals 974 according to the I2S protocol into analog audio line out signals for transmission on accessory interface connector 951 for audio playback on an accessory. DAC 925 may also convert digital video data received on digital media signals 974 into analog composite or S-video signals for transmission on accessory interface connector 951 for video playback on an accessory. In some embodiments, DAC 925 can also convert media data received from an accessory over analog media signals 975 into digital media data for transmission to a host device. For example, DAC 925 can convert analog audio received on analog audio line-in signals into digital media data in I2S protocol format for transmission to a host device via digital media signals 974 and bus protocol conversion circuitry 923. In some embodiments, DAC 925 may be capable of converting audio data, but not video data. In other embodiments, DAC 925 may be capable of converting both audio and video data.

DAC 925 may include any number of digital and/or analog filters to filter out noise and unwanted frequencies from being transmitted to an accessory and/or host device. DAC 925 may include any number of mixers to mix multiple channels of media data into one or more channels of media data. For example, a host device may transmit digital audio data in six channels (e.g., 5:1 surround sound), and the mixers can mix the six channels into audio left and right channels for transmission to an accessory. DAC 925 may include tone, volume, and/or color control circuitry that can be used to adjust these media parameters. Additionally or alternatively, DAC 925 may include gain and attenuation circuitry to control the amount of gain and attenuation on the media data being transmitted through DAC 925. Any of the filters, control circuitry, and/or gain and attenuation circuitry can be controlled and configured by DAC control signals 978 sent from controller 922. In some embodiments, DAC control signals 978 can be transmitted to DAC 925 from controller 922 using an I2C communication protocol. In other embodiments, another communication protocol (e.g., UART or SPI) that is suitable for controlling DAC 925 can be used.

Controller 922 can be a microcontroller or a microprocessor or the like. A clock crystal (XTAL) 921 provides a clock signal 965 to controller 922. Controller 922 may use clock signal 965 from XTAL 921 to derive a clock signal for DAC 925 and a clock signal for bus protocol conversion circuitry 923. The clock signals for DAC 925 and bus protocol conversion circuitry 923 can be at the same frequency or can be at different frequencies.

Controller 922 can include multiple communication interfaces that can be used to exchange communication data with bus protocol conversion circuitry 923, DAC 925, and accessory interface connector 951. For example, controller 922 may include one or more SPI protocol interfaces, one or more I2C protocol interfaces, and/or one or more UART protocol interfaces that can be used to exchange communication data with the other components of adapter 900. In one embodiment, communication data sent to and from bus protocol conversion circuitry 923 can be exchanged with controller 922 using a SPI communication protocol on data and control signals 976. Communication data sent to and from accessory interface connector 951 can be exchanged with controller 922 using a UART communication protocol on accessory UART signal channel 977. Controller 922 may also configure and send commands and control information to DAC 925 using an I2C communication protocol on DAC control signals 978. It should be understood that in other embodiments, controller 922 may communicate with the other components of adapter 900 using any suitable communication protocol.

According to some embodiments, controller 922 may perform two levels of conversion or translation on communication data received on any of its communication interfaces. At one level, controller 922 may convert or translate communication data received according to a communication protocol (e.g., I2C, UART, SPI, etc.) into another communication protocol (e.g., I2C, UART, SPI, etc.) while keeping the contents of the communication data the same. At a second level, controller 922 may additionally convert or translate the contents of the communication data. For example, a host device may send communication data including commands that the accessory may not be able to process, and/or vice versa. This may occur in instances where the host device is a newer generation device, and the accessory is an older generation accessory, or vice versa. In such instances, controller 922 may convert a command received from a host device via bus protocol conversion circuitry 923 that the accessory may not be able to recognize, into one or more commands suitable for the accessory such that the accessory can respond to the host device. Controller 922 may also convert a command received from an accessory received via accessory UART signal channel 977 that the host device may not be able to recognize, into one or more commands suitable for the host device such that the host device can respond to the accessory.

In some embodiments, the communication data received from bus protocol conversion circuitry 923 may include commands and control information such as volume adjustment commands. Controller 922 may format the commands and control information into a UART protocol format for transmission to accessory interface connector 951 on accessory UART signal channel 977. Controller 922 may alternatively transmit the commands and control information to DAC 925 instead of accessory interface connector 951, if DAC 925 is capable of responding to the particular commands and control information (e.g., if DAC 925 includes volume control circuitry). Similarly, communication data received from an accessory via accessory UART signal channel 977 on accessory interface connector 951 may include commands and control information. Controller 922 may transmit the commands and control information to bus protocol conversion circuitry 923 towards the host device, or alternatively transmit the commands and control information to DAC 925 instead of to bus protocol conversion circuitry 923 if DAC 925 is capable of responding to the particular commands and control information.

In some embodiments, in addition to processing communication data signals, controller 922 can also process certain miscellaneous signals 979 provided on accessory interface connector 951. For example, controller 922 may monitor an accessory detect signal (e.g., pin 20 of pin-out 701 as shown in FIG. 7) to determine if an accessory is connected to accessory interface connector 951. In an exemplary embodiment, if controller 922 detects that the accessory detect signal is pulled down, controller 922 can determine that an accessory is connected to accessory interface connector 951. In some embodiments, information regarding whether an accessory is connected on accessory interface connector 951 can be used by controller 922 to configure the data and power paths on accessory interface connector 951. For example, controller 922 may disable the data and power paths on accessory interface connector 951 if the accessory detect signal indicates there is no accessory connect to accessory interface connector 951. Furthermore, controller 922 may communicate information to a host device regarding whether an accessory is connected to accessory interface connector 951 by sending this information as communication data via data and control signals 976 to bus protocol conversion circuitry 923 towards the host device.

Miscellaneous signals 979 may also include an accessory ID signal (e.g., pin 10 of pin-out 701 as shown in FIG. 7) provided on accessory interface connector 951 to receive accessory identification information from an accessory that can be used to authenticate the accessory connected to accessory interface connector 951. According to some embodiments, when an accessory is connected to accessory interface connector 951, a resistance value is provided on the accessory ID signal. The resistance value can be used to identify the type of accessory that is connected to accessory interface connector 951 and to verify that the accessory is a valid and authorized accessory that can be used with adapter 900 and/or a host device that is connected to host interface connector 901.

In some embodiments, adapter 900 may include an authentication module 911 coupled to controller 922 that stores a set of resistance values and corresponding accessory types. Controller 922 may detect a resistance value on accessory ID signal and send the resistance value on accessory authentication signals 962 to authenticate module 911 according to a communication protocol (e.g., I2C, SPI, or UART). Authentication module 911 may compare the resistance value sent from controller 922 with the set of stored resistance values. If the resistance value matches one of the resistance values stored in authentication module 911, the accessory is authenticated as a valid device, and authentication module 911 may send information identifying the accessory type corresponding to the resistance value to controller 922. In response to the accessory being authenticated, controller 922 may enable the data and power paths on accessory interface connector 951 to enable the accessory to communicate with a host device. Controller 922 may also send the accessory type information to the host device via data and control signals 976 and bus protocol conversion circuitry 923.

If the resistance value sent to authentication module 911 does not match any of the resistance values stored in authentication module 911, authentication module 911 may indicate to controller 922 that the accessory connected to accessory interface connector 951 is an unauthorized device. In some embodiments, controller 922 may disable the data and power paths on accessory interface connector 951 if authentication module 911 indicates to controller 922 that the accessory connected to accessory interface connector 951 is an unauthorized device. Controller 922 may also inform a host device that the accessory connected to accessory interface connector 951 is an unauthorized device via data and control signals 976 and bus protocol conversion circuitry 923. Some or all of the functionality of authentication module 911 can be incorporated into controller 922.

According to some embodiments, the verification of the accessory ID and accessory authentication can be performed by the host device connected to host interface connector 901 instead. In this instance, adapter 900 may merely send the accessory identification information received from the accessory that is connected to connector 951 to the host device, or adapter 900 may translate the accessory identification information into a suitable format that can be transmitted to and be processed by the host device. The host device may use similar techniques described above to identify and authenticate the accessory. In other embodiments, both adapter 900 and the host device may perform the verification of the accessory ID and accessory authentication.

In various embodiments, adapter 900 includes an ID module 912 that is used to authenticate adapter 900 to a host device connected to host interface connector 901 via adapter ID signal 961. Adapter ID signal 961 can be coupled to the accessory ID contact on host interface connector 901 according to pin-out 501 as shown in FIG. 5 or pin-out 601 as shown in FIG. 6. When a host device is connected to host interface connector 901, the host device may send an ID request to adapter 900 on adapter ID signal 961 to request identification information from adapter 900. In response to the ID request, adapter 900 may send back an ID response that includes adapter ID information identifying adapter 900. The host device may authenticate adapter 900 if the adapter ID information received from adapter 900 is recognized as a known or compatible adapter for the host device. If adapter 900 is authenticated, host device may enable data and power paths in the host device that are coupled to host interface connector 901 through a host connector such that host device may exchange data with adapter 900. If adapter 900 is not authenticated (e.g., the host device does not recognize the adapter ID information), the host device may disable the data and power paths in the host device that are coupled to host interface connector 901 to prevent adapter 900 from communicating with the host device.

Adapter 900 may also include a power control module 942 coupled to ID module 912. Power control module 942 can be used to control a power path between a power-in signal 983 on host interface connector 901 and a $V_{bus}$ signal 984 on accessory interface connector 951. In some embodiments, $V_{bus}$ signal 984 can be coupled to pin 8, 11, or 12 (USB PWR, F/W PWR) of accessory interface connector 951 according to pin-out 701 as shown in FIG. 7. $V_{bus}$ signal 984 can provide a voltage and current from an accessory to charge or power a host device. The voltage and current provided on $V_{bus}$ signal 984 is coupled to power-in signal 983 on host interface connector 901 though power control module 942. In some embodiments, power-in signal 983 can be coupled to the host power contacts on host interface connector according to pin-out 501 as shown in FIG. 5 or pin-out 601 as shown in FIG. 6.

Power control module 942 can operate in a current-limiting mode or a bypass mode. Prior to authentication of adapter 900 by a host device, power control module 942 is operated in a current-limiting mode. In this mode, the limit signal 985 is deasserted, and power control module limits the amount of current that can be provided on power-in signal 983 from $V_{bus}$ signal 984 by coupling the two signals through a high-resistive path. In some embodiments, the amount of current that can be provided on power-in signal 983 may be limited to 20 milliamps or less. Upon authenticating adapter 900, the host device may instruct ID module 912 to assert limit signal 985 to put power control module 942 in bypass mode to enable the power path between $V_{bus}$ signal 984 and power-in signal 983. In bypass mode, power control module couples the two signals through a low-resistive path to allow the voltage and current on $V_{bus}$ signal 984 to be sent on power-in signal 983 to charge or power the host device. In some embodiments, power control module 942 may also include voltage and current regulators to regulate the amount of voltage and current provided to a host device in bypass mode.

In some embodiments, adapter 900 also includes power conversion circuitry 941 coupled between power-out signal 981 and accessory power signal 982. In instances where the accessory connected to accessory interface connector 951 is not a self-powered accessory, power conversion circuitry can convert the amount of voltage and/or current provided from a host device to voltage and current that is suitable to power the accessory. Power-out signal 981 can be coupled to the accessory power contact on host interface connector 901 according to pin-out 501 as shown in FIG. 5 or pin-out 601 as shown in FIG. 6. Accessory power signal 982 can be coupled to pin 13 of accessory interface connector 951 according to pin-out 701 as shown in FIG. 7. Power conversion circuitry 941 may include any number of low-dropout regulators (LDOs) to perform DC-to-DC voltage conversions, and may include current limiting circuitry to limit the amount of current provided on accessory power signal 982 from power-out signal 981.

Figure 10:
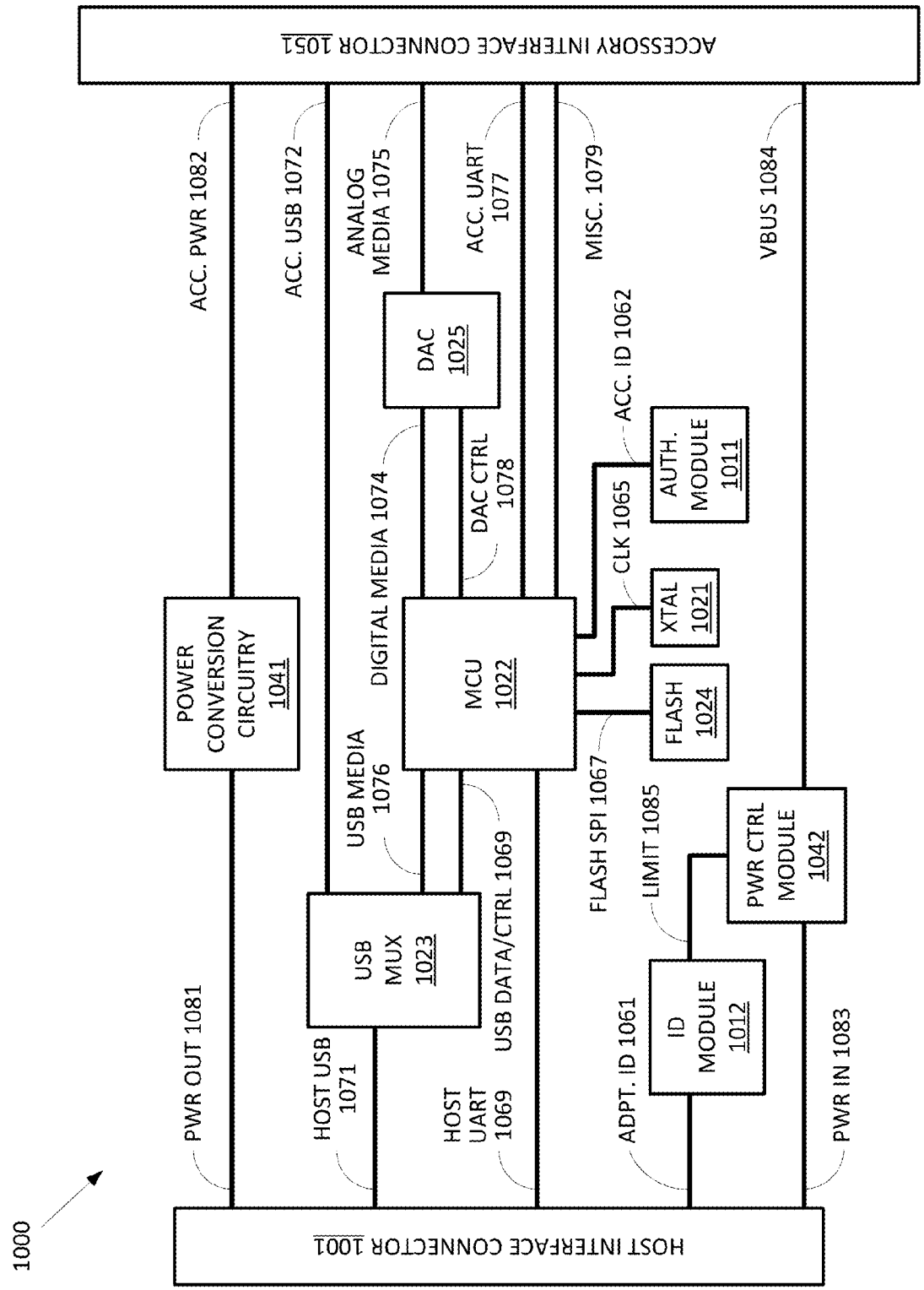
FIG. 10 illustrates a detailed block diagram of an adapter according to a different embodiment of the present invention.

FIG. 10 illustrates a detailed block diagram of an adapter 1000 according to another exemplary embodiment. Adapter 1000 includes some components that are similar to those described above with reference to adapter 900 shown in FIG. 9. Thus, a detail description of the functionalities of components of adapter 1000 that are similar to the components of adapter 900 will not be repeated here.

As shown in FIG. 10, adapter 1000 does not exchange data with a host device using a proprietary communication protocol. Instead, adapter 1000 communicates with a host device via host interface connector 1001 using a USB communication protocol on a host USB signal channel 1071 and a UART communication protocol on host UART signal channel 1069. Host USB signal channel 1071 can be coupled to the Data 1 and Data 2 contacts of host interface connector 1001, and host UART signal channel 1069 can be coupled to Data 3 and Data 4 contacts of host interface connector 1001 according to pin-outs 501 or 601 as shown in FIGS. 5 and 6, respectively. Alternatively, host USB signal channel 1071 can be coupled to the Data 3 and Data 4 contacts of host interface connector 1001, and host UART signal channel 1069 can be coupled to Data 1 and Data 2 contacts of host interface connector 1001.

According to this exemplary embodiment, host USB signal channel 1071 can be used to exchange both communication data and media data with an accessory. The communication data can include bulk transfer data, and commands and control information which can be used to operate an accessory via the host device, and/or vice versa. The communication data transmitted on host USB signal channel 971 can also include any data that an accessory is designed to exchange with a host device using the USB communication protocol. The media data transmitted on host USB signal channel 1071 for playback can include audio over USB data, video over USB data, or both.

Adapter 1000 includes a USB multiplexer 1023 that is used to multiplex and de-multiplex the various types of USB data being transmitted through adapter 1000. As described above, the USB data transmitted on host USB signal channel 1071 may include communication data as well as media data. USB multiplexer 1023 can de-multiplex the host data received on host USB signal channel 1071 into communication data that can be sent to accessory host interface connector 1051 via accessory USB signal channel 1072, media data that can be sent to controller 1022 via USB media signals 1076, and/or communication data that can be sent to controller 1022 via USB data and control signals 1069. In some embodiments, USB media signals 1076 can be combined with USB data and control signals 1069 into a signal USB bus.

According to some embodiments, the communication data transmitted on host USB signal channel 1071 may include command and control information that DAC 1025 can process (e.g., volume adjustment). USB multiplexer 102 can extract or parse out these commands and control information that DAC 10-25 can process, and send them to controller 1022 via USB data and control signals 1069. Controller 1022 may then convert or translate the DAC commands and control information in USB protocol format into a format suitable for DAC 1025 (e.g., I2C, UART, or SPI protocol format), and send the commands and control information that DAC 1025 can process via DAC control signals 1078.

USB multiplexer 1023 may also send some or all of the other communication data transmitted on host USB signal channel 1071 to controller 1022 for conversion into UART protocol format for transmission to an accessory via accessory UART signal channel 1077. For example, a host device may send certain types of communication data on host USB signal channel 1071 that an accessory expects to receive on accessory UART signal channel 1077. USB multiplexer 1023 may send such communication data to controller 1022 via USB data and control signals 1069 instead of accessory USB signal channel 1072, such that controller 922 can send such communication data to an accessory via accessory UART signal channel 1077. In one embodiment, an accessory may be designed to receive only bulk data on accessory USB signal channel 1072, and any commands and control information are to be received on accessory UART signal channel 1077. USB multiplexer 1023 may extract or parse out commands and control information from the communication data transmitted on host USB signal channel 1071, and send them to controller 1022 for conversion into a UART protocol format for transmission on accessory UART signal channel 1077. Bulk transfer data from communication data transmitted on host USB signal channel 1071 can be sent on accessory USB signal channel 1072. In some embodiments, USB multiplexer 1023 may split up the communication data transmitted on host USB signal channel 1071 into communication data for transmission on accessory USB signal channel 1072 and communication data for transmission on USB data and control signals 1069 based on the available bandwidth on accessory USB signal channel 1072 and accessory UART signal channel 1077.

USB multiplexer 1023 may also multiplex and combine the communication data received on accessory USB signal channel 1072 and USB data and control signals 1069 with media data received on USB media signals 1076 into a single USB data stream for transmission on host USB signal channel 1071. In some embodiments, some or all of the communication data in UART protocol format transmitted on accessory UART signal channel 1077 can be converted into communication data in USB protocol format by controller 1022. The converted communication data can be set to USB multiplexer 1023 via USB data and control signals 1069 for transmission to a host device via host USB signal channel 1071. Controller 1022 may determine how to split up the communication data received on accessory UART signal channel 1077 into communication data for transmission on USB data and control signals 1069 and communication data for transmission on host UART signal channel 1069 based on the available bandwidth on host USB signal channel 1071 and host UART signal channel 1069.

In other embodiments, all communication data that are transmitted on accessory UART signal channel 1077 can be transmitted on host UART signal channel 1069, and vice versa. All communication data that are transmitted on accessory USB signal channel 1072 can be transmitted on host USB signal channel 1071. In other words, in these embodiments, adapter 1000 does not convert communication data in USB protocol format into communication data in UART protocol format, or vice versa.

Adapter 1000 may also include a flash memory 1024 coupled to controller 1022. Flash memory 1024 may communicate with controller 1022 using a SPI communication protocol via Flash SPI signals 1067. In other embodiments, flash memory 1024 may communicate with controller 1022 using other communication protocols or through a memory interface of controller 1022. Flash memory 1024 may store codecs and/or instructions and/or program code that controller 1022 may use to convert audio over USB and/or video over USB data transmitted on USB media signals 1076 into media data that can be transmitted on digital media signals 1074 to DAC 1025. In some embodiments, the media data is transmitted to DAC 1025 according to I2S protocol. In other embodiments, any communication protocol that is suitable for exchanging media data for playback can be used.

In the description provided above, while references have been made to specific communication protocols that are used by various embodiments, it should be understood that any of the specific communication protocols used by the various embodiments can be substituted with any communication protocol that is suitable for exchanging data between a host device and an accessory. Furthermore, any of the functionalities of any of the components described above can be combined, shared, or split up into any number of components. It should also be understood that while the host interface connector according to some embodiments have been described as an eight-contact dual orientation connector and the accessory connector according to some embodiment have been described as a 30-pin connector, in other embodiments, other connectors (plug or receptacle) with any number of contacts or pins can be used for the host interface connector and/or the accessory interface connector. Furthermore, while the host interface connector may have fewer contacts than the accessory interface connector in some embodiments, in other embodiments, the host interface connector may have more contacts or the same number of contacts as the accessory interface connector.

As discussed above, an adapter (e.g., adapter 800, 900 or 1000) according to various embodiments can perform two levels of authentication to authenticate the adapter to a host device (i.e. adapter authentication) and to authenticate an accessory (i.e. accessory authentication). In some embodiments, the adapter authentication and the accessory authentication may occur independently of each other. For example, the adapter may authenticate itself to a host device in response to a host device being connected to the host interface connector independently from the accessory authentication process, and the adapter may authenticate an accessory in response to an accessory being connected to the accessory interface connector independently from the adapter authentication process.

In other embodiments, the adapter can be authenticated to a host device first before the adapter can authenticate an accessory. For example, the controller of the adapter can set the contacts or pins on the accessory interface connector in an open or unconnected state to disable the data and power paths on the accessory interface connector prior to authenticating itself to a host device. This way, accessory does not recognize that it is connect to a host device until after the adapter authenticates itself to the host device and after the host device has configured its contacts to allow communication between the host device and the adapter. Once the host device and the adapter are operatively connected and in full communication with each other, the adapter can set the contacts or pins on the accessory interface connector into a closed or connected state to connect the contacts or pins with appropriate circuitry, such that the accessory recognizes it has been connected to the adapter. The adapter can then authenticate the accessory, and initiate and complete a communication link between the adapter and the accessory, and then ultimately the host device to the accessory via the adapter.

In alternative embodiments, the adapter can authenticate an accessory first before the adapter authenticates itself to a host device. For example, the controller of the adapter can set the contacts or pins on the host interface connector in an open or unconnected state to disable the data and power paths on the host interface connector prior to authenticating an accessory. This way, a host device does not recognize that it is connect to the adapter until after the adapter has authenticated the accessory. Once the adapter and the accessory are operatively connected and in full communication with each other, the adapter can set the contacts or pins on the host interface connector into a closed or connected state to connect the pins with appropriate circuitry, such that the host device can recognize it has been connected to the adapter. The host device can then authenticate the adaptor, and initiate and complete a communication link between the host device and the adapter, and then ultimately the host device to the accessory via the adapter.

Figure 11:
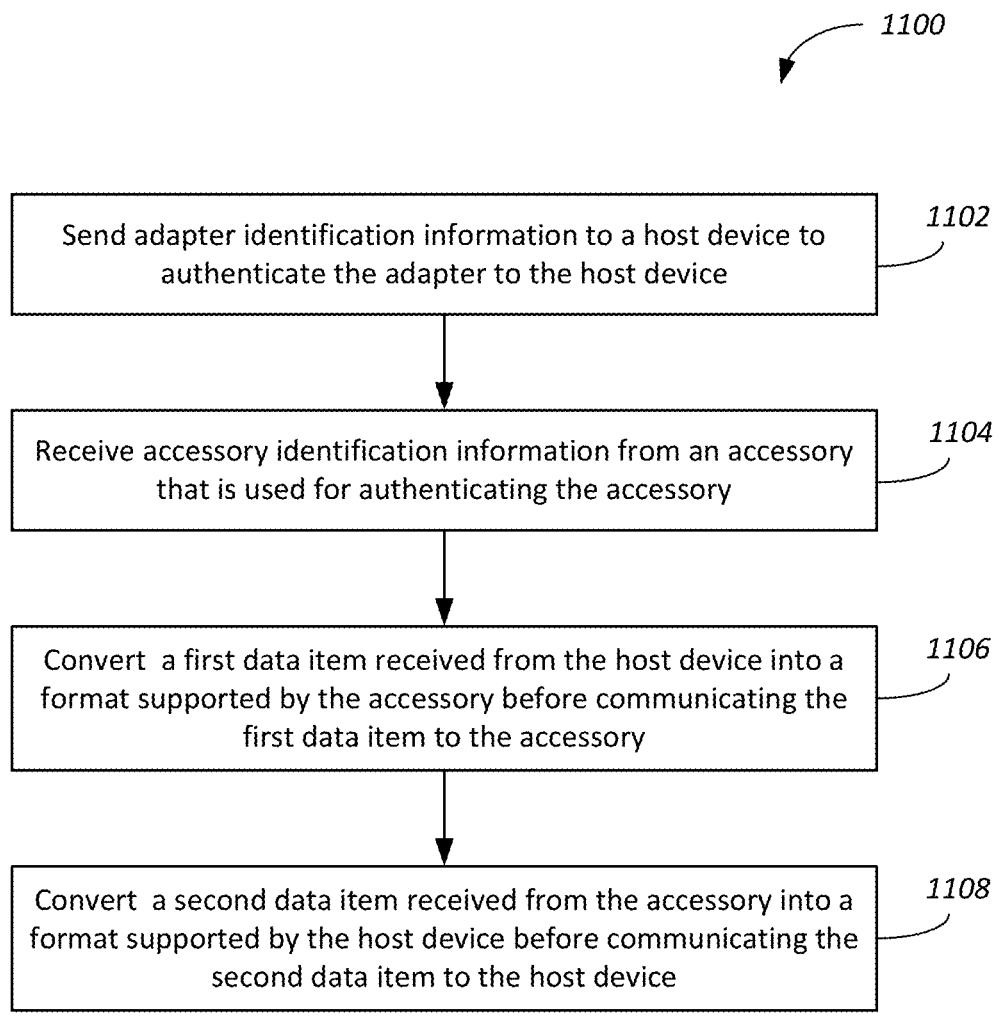
FIG. 11 illustrates a flow diagram for providing connectivity between a host device and an accessory according to an embodiment of the present invention.

FIG. 11 illustrates a flow diagram for using an adapter (e.g., adapter 800, 900, or 1000) coupled between a host device and an accessory to provide connectivity between a host connector of a host device and an accessory connector of an accessory that is incompatible with the host connector, according to one embodiment. The adapter includes a host interface connector that is coupled to and compatible with the host connector of the host device. The adapter also includes an accessory interface connector that is coupled to and compatible with the accessory connector of the accessory.

At block 1102, the adapter, as part of an adapter authentication process, sends adapter identification information to the host device via the host interface connector. The adapter identification information can include an identifier associated with the adapter such as a serial number, model number, manufacturer ID, etc. If the host device recognizes the adapter identification information as identifying a valid and compatible adapter that can operate with the host device, the host device may authenticating the adapter, and instruct the adapter to enable a power path between the host interface connector and the accessory interface connector.

At block 1104, the adapter receives, via the accessory interface connector as part of an accessory authentication process, accessory identification information from the accessory that can be used to authenticate the accessory. The accessory identification information can be a resistance value that can be used to identify the accessory. The accessory identification information can also be an identifier associated with the accessory such as a serial number, model number, manufacturer ID, etc. If the adapter recognizes the accessory identification information as a valid and compatible accessory that can be used with the adapter and/or the host device, the adapter may authenticate the accessory, and enable data and power paths on the accessory interface connector. Alternatively or additionally, the adapter may send the accessory identification information received from the accessory to the host device to enable the host device to perform accessory authentication.

It should be understood that in some embodiments, the adapter authentication process and the accessory authentication process can be performed independently. In other embodiments, the adapter authentication process is performed before the accessory authentication process can be performed, or alternatively, the accessory authentication process is performed before the adapter authentication process can be performed Upon authenticating the adapter to a host device and/or authenticating the accessory, at block 1106, the adapter may convert host data received in one format on the host interface connector from the host device into another format that is supported by the accessory before communicating the data to the accessory. The host data can include media data and communication data transmitted in a single data stream on a set of host communication protocol signals on the host interface connector. The accessory data can include media data for media playback transmitted on a set of analog media signals and communication data transmitted on a set of accessory communication protocol signals on the accessory interface connector.

At block 1108, the adapter may convert accessory data received in a particular format on the accessory interface connector from the accessory into a format that is supported by the host device before communicating the data to the host device. The conversion between the host data and the accessory data can be performed according to any of the techniques described above with reference to the adapters of FIGS. 8-10.

It should be appreciated that the specific steps illustrated in FIG. 11 provides a particular method of operating an adapter according to an embodiment of the present invention. Other sequences of steps may also be performed according to alternative embodiments. For example, alternative embodiments of the present invention may perform the steps outlined above in a different order. In some embodiments, the accessory may ensure that it has been authenticated by the host device prior to enabling the bias on the data contacts. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Embodiments of the present invention can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, although the invention has been described with respect to specific embodiments, it will be appreciated that the invention is intended to cover all modifications and equivalents within the scope of the following claims.

What is claimed is:

1. An adapter for providing connectivity between a first connector of a host device and a second connector of an accessory, wherein the first connector is incompatible with the second connector, the adapter comprising:
   a host interface connector compatible with the first connector, wherein the host interface connector includes a first set of contacts;
   an accessory interface connector compatible with the second connector, wherein the accessory interface connector includes a second set of contacts;
   conversion circuitry coupled to the host interface connector and the accessory interface connector, the conversion circuitry configured to:
   receive first host data in a first format that contains digital media information from the host device;
   convert the first host data, received from the host device, into first accessory data in a second format that includes analog media data; and
   transmit the first accessory data to the accessory using the accessory interface connector;
   an authentication module coupled to the accessory interface connector for receiving accessory identification information from the accessory that is used for authenticating the accessory; and
   an identification module coupled to the host interface connector for providing adapter identification information to the host device to authenticate the adapter to the host device.

2. The adapter of claim 1, wherein the conversion circuitry is further configured to:
   receive second accessory data in a third format from the accessory;
   convert the second accessory data in the third format into second host data in the first format for transmission to the host device; and
   transmit the second host data in the first format to the host device using the host interface connector.

3. The adapter of claim 2, wherein the third format is one of: a Universal Asynchronous Receiver/Transmitter (UART) data format, or USB data format.

4. The adapter of claim 1, further comprising a power control module configured to enable a power path between the host interface connector and the accessory interface connector after the adapter has been authenticated to the host device.

5. The adapter of claim 1, wherein the first format is a Universal Serial Bus (USB) data format.

6. The adapter of claim 1, wherein a portion of the first host data received in the first format from the host device is transmitted to the accessory without any conversion.

7. The adapter of claim 1, wherein the analog media data is transmitted to the accessory using at least one of: an audio line signal, a composite video signal, or a S-video signal.

8. The adapter of claim 1, wherein the accessory interface connector includes 30 contacts, and the host interface connector includes fewer contacts than the accessory interface connector.

9. The adapter of claim 8 wherein the host interface connector includes 4 to 16 contacts.

10. A method for using an adapter coupled between a host device and an accessory, wherein a first connector associated with the host device is incompatible with a second connector associated with the accessory, the method comprising:
   sending, by the adapter to the host device, adapter identification information to authenticate the adapter to the host device, the adapter identification information being sent over a host interface connector of the adapter that is compatible with the first connector;
   receiving, by the adapter from the accessory, accessory identification information that is used for authenticating the accessory, the accessory identification information being received via an accessory interface connector of the adapter that is compatible with the second connector;
   upon authentication of the adapter by the host device, converting, by the adapter, a first data item received from the host device into a format supported by the accessory before communicating the first data item to the accessory;
   wherein the first data item includes digital media information, and converting the first data item includes converting the digital media information into analog media data for transmission to the accessory via the accessory interface connector.

11. The method of claim 10, further comprising converting, by the adapter, a second data item received from the accessory into a format supported by the host device before communicating the second data item to the host device.

12. The method of claim 11, wherein the second data item is received from the accessory using an accessory communication protocol characterized by one of Universal Asynchronous Receiver/Transmitter (UART) signals or USB signals.

13. The method of claim 10, further comprising enabling, by the adapter, a power path between the host interface connector and the accessory interface connector after the adapter has been authenticated to the host device.

14. The method of claim 10, wherein the step of sending adapter identification information to the host device is performed after the accessory has been authenticated.

15. The method of claim 10, wherein the step of sending adapter identification information to the host device is performed prior to the accessory being authenticated.

16. The method of claim 10, wherein the first data item is received from the host device using a host communication protocol.

17. The method of claim 16, wherein the host communication protocol is characterized by Universal Serial Bus (USB) signals.

18. The method of claim 16, wherein the analog media data is transmitted to the accessory using at least one of: an audio line signal, a composite video signal, or a S-video signal.

19. The method of claim 10, wherein the accessory interface connector includes 30 contacts, and the host interface connector includes fewer contacts than the accessory interface connector.

20. The method of claim 19, wherein the host interface connector includes 4 to 16 contacts.

21. An adapter for providing connectivity between a first connector of a host device and a second connector of an accessory, wherein the first connector is incompatible with the second connector, the adapter comprising:
   a host interface connector compatible with the first connector, wherein the host interface connector includes a first set of contacts;
   an accessory interface connector compatible with the second connector, wherein the accessory interface connector includes a second set of contacts;
   conversion circuitry coupled to the host interface connector and the accessory interface connector, the conversion circuitry configured to:

receive first host data in a first format that contains digital media information from the host device;

convert the first host data, received from the host device, into first accessory data in a second format that includes analog media data; and transmit the first accessory data to the accessory using the accessory interface connector;

an identification module coupled to the host interface connector for providing adapter identification information to the host device to authenticate the adapter to the host device; and a power control module configured to enable a power path between the host interface connector and the accessory interface connector after the adapter has been authenticated to the host device.

22. The adapter of claim 21, wherein the conversion circuitry is further configured to:

receive second accessory data in the second format from the accessory;

convert the second accessory data in the second format into second host data in the first format for transmission to the host device; and transmit the second host data in the first format to the host device using the host interface connector.

23. The adapter of claim 21, further comprising an authentication module coupled to the accessory interface connector for receiving accessory identification information from the accessory that is used for authenticating the accessory.

* * * * *